(12) United States Patent
Degrace et al.

(10) Patent No.: US 11,799,785 B2
(45) Date of Patent: Oct. 24, 2023

(54) HARDWARE-BASED PACKET FLOW PROCESSING

(71) Applicant: MICROSOFT TECHNOLOGY LICENSING, LLC, Redmond, WA (US)

(72) Inventors: Gerald Roy Degrace, Atlanta, GA (US); Deepak Bansal, Bellevue, WA (US); Rishabh Tewari, Sammamish, WA (US); Michal Czeslaw Zygmunt, Bellevue, WA (US); Deven Jagasia, Kirkland, WA (US); Lihua Yuan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/334,997

(22) Filed: May 31, 2021

(65) Prior Publication Data

US 2022/0337526 A1    Oct. 20, 2022

Related U.S. Application Data

(60) Provisional application No. 63/173,352, filed on Apr. 9, 2021, provisional application No. 63/173,334, filed
(Continued)

(51) Int. Cl.
*H04L 47/2441* (2022.01)
*H04L 47/125* (2022.01)
(Continued)

(52) U.S. Cl.
CPC ........ *H04L 47/2441* (2013.01); *H04L 47/125* (2013.01); *H04L 47/2416* (2013.01); *H04L 47/29* (2013.01)

(58) Field of Classification Search
CPC .............. H04L 47/2441; H04L 47/125; H04L 47/2416; H04L 47/29
See application file for complete search history.

(56) References Cited

U.S. PATENT DOCUMENTS

| 8,059,532 B2 | 11/2011 | Riddle et al. |
| 9,258,742 B1 | 2/2016 | Pianigiani et al. |

(Continued)

FOREIGN PATENT DOCUMENTS

| CN | 103051510 A | 4/2013 |
| CN | 104753704 A | 7/2015 |

(Continued)

OTHER PUBLICATIONS

"Non Final Office Action Issued in U.S. Appl. No. 17/335,027", dated Mar. 22, 2022, 8 Pages.
(Continued)

*Primary Examiner* — Jung H Park
(74) *Attorney, Agent, or Firm* — Han Gim; Newport IP, LLC

(57) ABSTRACT

Techniques are disclosed for processing data packets by a hardware-based networking device configured to disaggregate processing of data packets from hosts of a virtualized computing environment. The hardware-based networking device includes a hardware-based component implementing a plurality of behavioral models indicative of packet processing graphs for data flows in the virtualized computing environment. A data packet having a source from or destination to an endpoint in a virtual network of the virtualized computing environment is received. Based on determining that the data packet is a first packet of a data flow to or from the endpoint, one of the behavioral models is mapped to the data flow. The packet is modified in accordance with the mapped behavioral model. A state of the data flow is stored.

(Continued)

Subsequent data packets of the data flow are processed based on the stored state.

20 Claims, 18 Drawing Sheets

Related U.S. Application Data on Apr. 9, 2021, provisional application No. 63/173,348, filed on Apr. 9, 2021, provisional application No. 63/173,336, filed on Apr. 9, 2021.

(51) Int. Cl.
*H04L 47/2416* (2022.01)
*H04L 47/10* (2022.01)

(56) References Cited

U.S. PATENT DOCUMENTS

| | | | |
|---|---|---|---|
| 9,264,400 | B1 | 2/2016 | Lin et al. |
| 9,584,436 | B1 | 2/2017 | Rodgers et al. |
| 9,654,513 | B1 | 5/2017 | Ashley et al. |
| 10,228,930 | B2 | 3/2019 | Srinivasan et al. |
| 10,541,919 | B1 | 1/2020 | Hooda et al. |
| 10,756,886 | B2 | 8/2020 | Ganguli et al. |
| 10,785,020 | B2 | 9/2020 | Balasubramanian et al. |
| 11,102,164 | B1 | 8/2021 | Gupta et al. |
| 11,122,115 | B1* | 9/2021 | Sagie ............... H04L 47/2441 |
| 11,184,238 | B1 | 11/2021 | Lu et al. |
| 11,190,406 | B1 | 11/2021 | Tewari et al. |
| 2006/0029097 | A1 | 2/2006 | Mcgee et al. |
| 2013/0223226 | A1 | 8/2013 | Narayanan et al. |
| 2013/0332983 | A1 | 12/2013 | Koorevaar et al. |
| 2014/0052836 | A1 | 2/2014 | Nguyen et al. |
| 2014/0075519 | A1 | 3/2014 | Porras et al. |
| 2014/0098669 | A1 | 4/2014 | Garg et al. |
| 2014/0241356 | A1 | 8/2014 | Zhang et al. |
| 2015/0163158 | A1 | 6/2015 | Ryland |
| 2015/0365327 | A1 | 12/2015 | Barabash et al. |
| 2016/0042014 | A1 | 2/2016 | Jalan et al. |
| 2016/0043901 | A1 | 2/2016 | Sankar et al. |
| 2016/0241513 | A1 | 8/2016 | Sridharan et al. |
| 2016/0255051 | A1 | 9/2016 | Williams et al. |
| 2016/0285750 | A1 | 9/2016 | Saquib et al. |
| 2016/0380899 | A1 | 12/2016 | Lee et al. |
| 2017/0346736 | A1 | 11/2017 | Chander et al. |
| 2018/0262556 | A1 | 9/2018 | Firestone |
| 2018/0262599 | A1 | 9/2018 | Firestone |
| 2018/0287859 | A1 | 10/2018 | Desigowda et al. |
| 2018/0359131 | A1 | 12/2018 | Cheng et al. |
| 2018/0367431 | A1* | 12/2018 | Lai .................... H04L 43/16 |
| 2018/0367609 | A1 | 12/2018 | Ozkan |
| 2019/0037033 | A1 | 1/2019 | Khakimov et al. |
| 2019/0297114 | A1 | 9/2019 | Panchalingam et al. |
| 2019/0379572 | A1 | 12/2019 | Yadav et al. |
| 2020/0007629 | A1 | 1/2020 | Tse et al. |
| 2020/0021609 | A1 | 1/2020 | Kuppanna et al. |
| 2020/0053012 | A1* | 2/2020 | Evans ............... H04L 47/2441 |
| 2020/0092299 | A1 | 3/2020 | Srinivasan et al. |
| 2020/0267051 | A1 | 8/2020 | Ranjbar et al. |
| 2020/0274828 | A1 | 8/2020 | Alapati et al. |
| 2020/0278892 | A1 | 9/2020 | Nainar et al. |
| 2020/0344662 | A1 | 10/2020 | Maino et al. |
| 2020/0371842 | A1 | 11/2020 | Tewari et al. |
| 2021/0044622 | A1 | 2/2021 | Venkataramanan et al. |
| 2021/0117249 | A1 | 4/2021 | Doshi et al. |
| 2021/0385149 | A1 | 12/2021 | Suryanarayana et al. |
| 2021/0385155 | A1 | 12/2021 | Suryanarayana et al. |
| 2022/0060569 | A1* | 2/2022 | Wang ................. H04L 49/90 |
| 2022/0086025 | A1 | 3/2022 | Tewari et al. |
| 2023/0155942 | A1 | 5/2023 | Degrace et al. |

FOREIGN PATENT DOCUMENTS

| | | |
|---|---|---|
| CN | 113573324 A | 10/2021 |
| EP | 3340534 A1 | 6/2018 |
| EP | 3629533 A1 | 4/2020 |
| JP | 2014527768 A | 10/2014 |
| JP | 2015508622 A | 3/2015 |
| KR | 20180040356 A | 4/2018 |
| KR | 102383782 B1 | 4/2022 |
| WO | 2013025229 A1 | 2/2013 |
| WO | 2015080525 A1 | 6/2015 |
| WO | 2015117642 A1 | 8/2015 |
| WO | 2016107379 A1 | 7/2016 |
| WO | 2016163927 A1 | 10/2016 |
| WO | 2016197004 A2 | 12/2016 |
| WO | 2019101054 A1 | 5/2019 |
| WO | 2019135249 A1 | 7/2019 |
| WO | 2020242957 A1 | 12/2020 |

OTHER PUBLICATIONS

"NP7 Acceleration", https://fortinetweb.s3.amazonaws.com/docs.fortinet.com/v2/attachments/5b863502-468b-11e9-94bf-00505692583a/fortios-hardware-acceleration-626.pdf, Retrieved Date: Dec. 29, 2020, 233 Pages.

Caulfield, et al., "Beyond SmartNICs: Towards a Fully Programmable Cloud", in Proceedings of the IEEE International Conference on High Performance Switching and Routing, Jun. 2018, 6 Pages.

Firestone, et al., "Azure Accelerated Networking: SmartNICs in the Public Cloud", in Proceedings of the 15th USENIX Symposium on Networked Systems Design and Implementation, Apr. 9, 2018, 14 Pages.

Miano, et al., "Partial offloading of OpenFlow Rules on a Traditional Hardware Switch ASIC", in Proceedings of the IEEE Conference on Network Softwarization, Jul. 3, 2017, 9 Pages.

Moon, et al., "AccelTCP: Accelerating Network Applications with Stateful TCP Offloading", in Proceedings of the 17th USENIX Symposium on Networked Systems Design and Implementation, Feb. 25, 2020, pp. 77-92.

Subramanian, et al., "D2R: Dataplane-Only Policy-Compliant Routing Under Failures", in Journal of the Computing Research Repository, Dec. 5, 2019, 17 Pages.

Tork, et al., "Lynx: A SmartNIC-driven Accelerator-centric Architecture for Network Servers", in Proceedings of the Twenty-Fifth International Conference on Architectural Support for Programming Languages and Operating Systems, Mar. 16, 2020, pp. 117-131.

"Non Final Office Action Issued in U.S. Appl. No. 17/335,014", dated Jul. 18, 2022, 15 Pages.

Yu, et al., "Fault Management in Software-Defined Networking: A Survey", in Journals of IEEE Communications Surveys & Tutorials, vol. 21, Issue 1, Sep. 6, 2018, pp. 349-392.

"International Search Report and Written Opinion Issued in PCT Application No. PCT/US22/021066", dated Jun. 27, 2022, 16 Pages.

Derstro, "BGP preferring routes with longer as-path prepend", Retrieved from: https://www.reddit.com/r/networking/comments/1z53cx/bgp_preferring_routes_with_longer_aspath_prepend/, Feb. 28, 2014, 5 Pages.

"International Search Report and Written Opinion Issued in PCT Application No. PCT/US22/020673", dated Jun. 2, 2022, 12 Pages.

"International Search Report and Written Opinion Issued in PCT Application No. PCT/US22/021062", dated Jun. 9, 2022, 12 Pages.

"International Search Report and Written Opinion Issued in PCT Application No. PCT/US22/021064", dated Jun. 22, 2022, 9 Pages.

"Non Final Office Action Issued in U.S. Appl. No. 17/334,999", dated Aug. 11, 2022, 10 Pages.

"Notice of Allowance Issued in U.S. Appl. No. 17/334,999", dated Feb. 2, 2023, 11 Pages.

"Notice of Allowance Issued in U.S. Appl. No. 17/335,014", dated Jan. 19, 2023, 9 Pages.

"Notice of Allowance Issued in U.S. Appl. No. 17/335,027", dated Oct. 13, 2022, 8 Pages.

(56) References Cited

OTHER PUBLICATIONS

"Notice of Allowance Issued in U.S. Appl. No. 18/152,732", dated Jun. 22, 2023, 12 Pages.

* cited by examiner

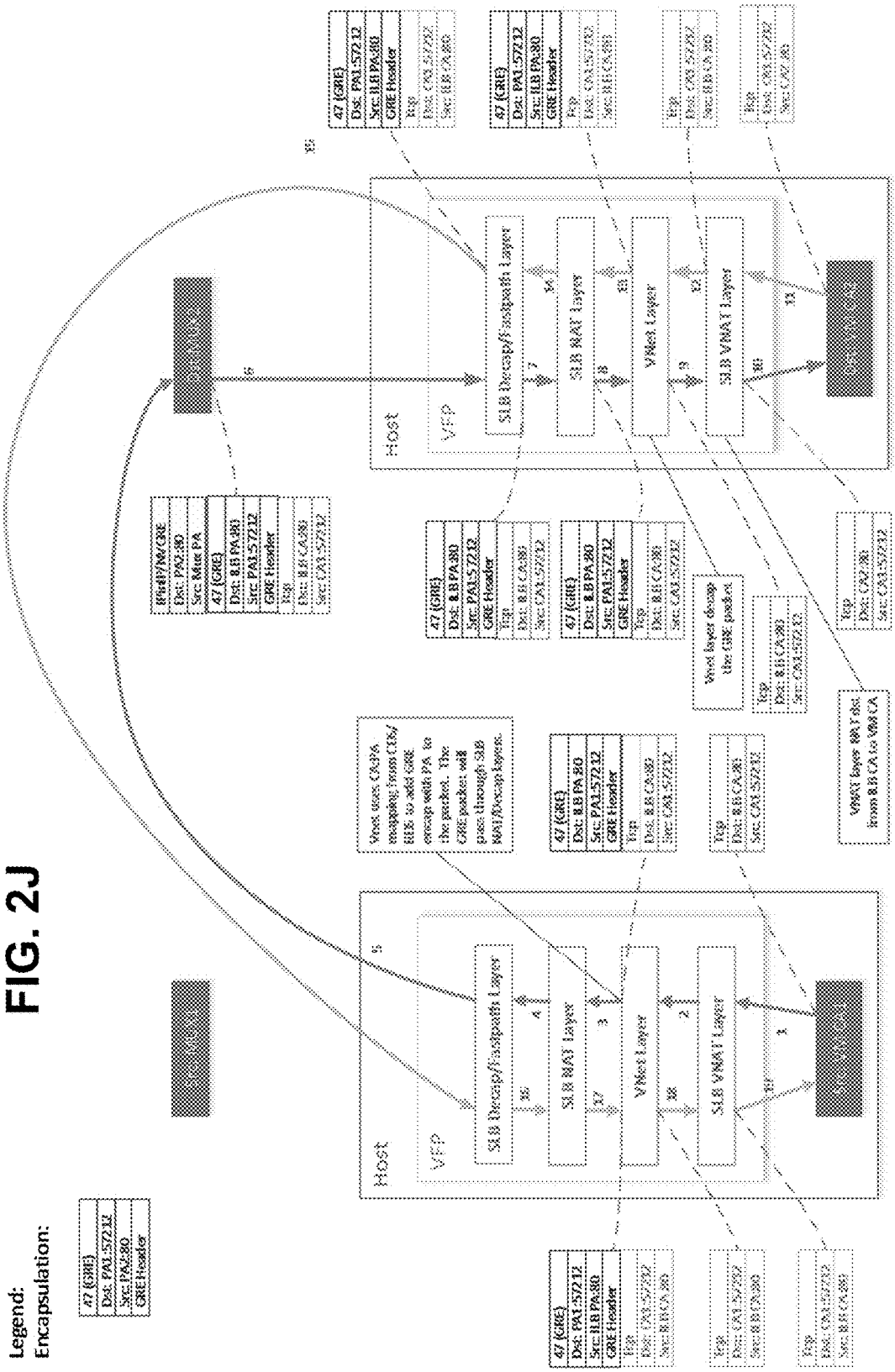

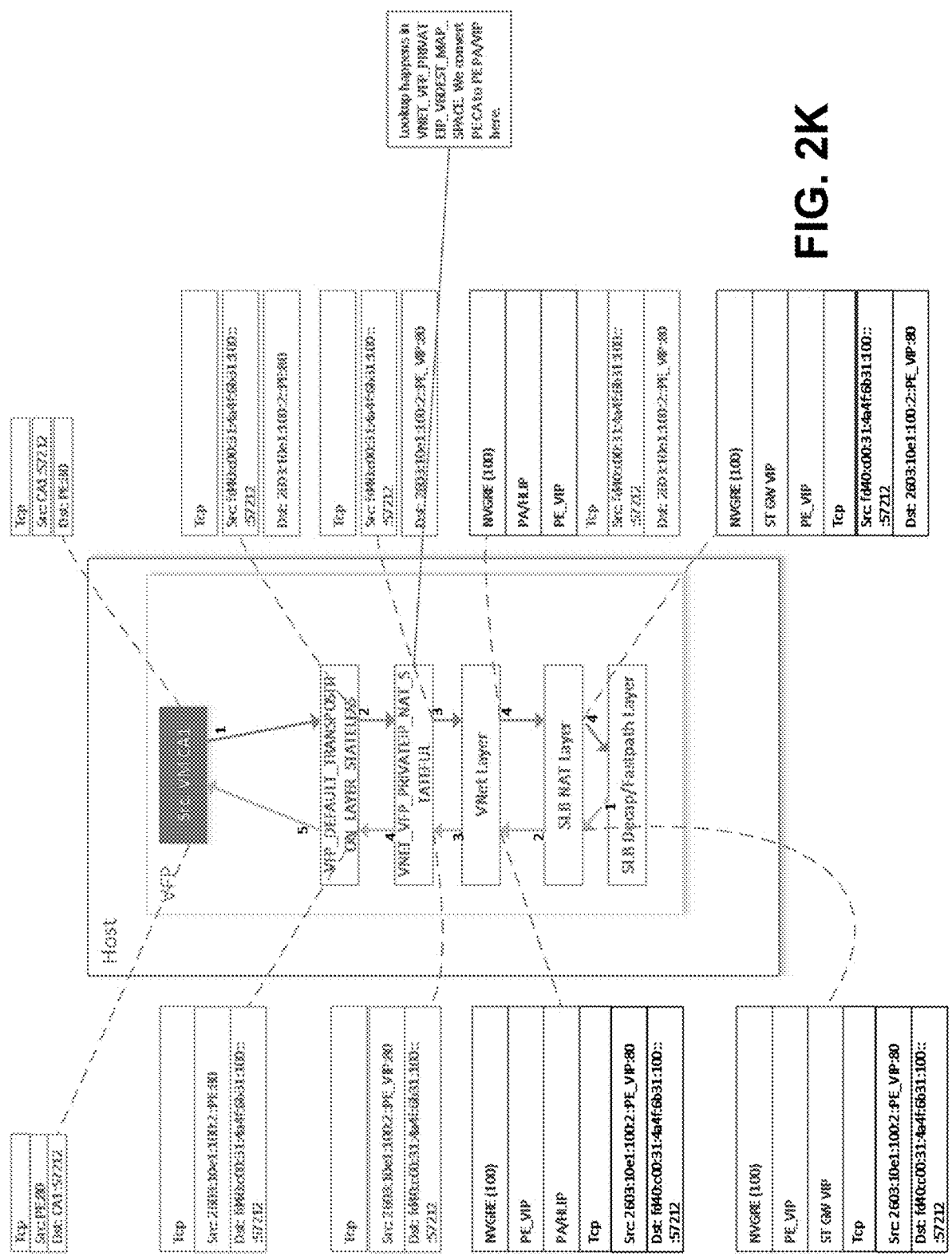

HARDWARE-BASED PACKET FLOW PROCESSING

PRIORITY APPLICATION

This application claims the benefit of and priority to U.S. Provisional Application No. 63/173,352, filed Apr. 9, 2021, U.S. Provisional Application No. 63/173,334, filed Apr. 9, 2021, U.S. Provisional Application No. 63/173,336, filed Apr. 9, 2021, and U.S. Provisional Application No. 63/173,348, filed Apr. 9, 2021, the entire contents of which are incorporated herein by reference.

BACKGROUND

A data center is a facility that houses computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

Many cloud architectures offload networking stack tasks to implement policies such as tunneling for virtual networks, security, and load balancing. By offloading packet processing tasks to hardware devices such as a network interface card (NIC) and/or a field programmable gate array (FPGA), the capacity of CPU cores can be reserved for running cloud services and reducing latency and variability to network performance. However, the initial identification of data flows, porting information, and applicable policies are still performed by the hosts in software. This can result in a limit to the number of connections that can be processed.

The present disclosure provides a way for hardware-based network devices to perform processing of data flows including the initial identification of data flows, porting information, and applicable policies. Thus, the hardware-based network device can identify the first packet of a new data flow, maintain cache states for the new data flow, apply applicable policies for the data flow, process subsequent packets in the new data flow, and terminate application of the policies in the flow tables when the data flow is complete. The hardware-based network device can perform these functions without the need to invoke software-based processing.

In an embodiment, the policies and other configuration information for a flow can be represented using a standardized format. Furthermore, the representation may be provided via a programming interface, allowing for offloading of the necessary processing to be provided to hardware-based elements of the network or other device. The hardware-based elements may be configured to interpret and apply the received representation, thus allowing for faster processing of the flows as compared to applying transformations in software. In one embodiment, this allows for the initial flow processing to be performed entirely in the data plane, resulting in a significant increase in the connections/sec that can be processed by the host network.

In some embodiments, aspects of the disclosure may implement some or all of the functionality of U.S. application Ser. No. 17/334,999 entitled "entitled "ARCHITECTURES FOR DISAGGREGATING SDN FROM THE HOST" filed on May 31, 2021 U.S. application Ser. No. 17/335,014 entitled "HIGH AVAILABILITY FOR HARDWARE-BASED PACKET FLOW PROCESSING" filed on May 31, 2021, and U.S. application Ser. No. 17/335,027 entitled "SCALING HOST POLICY VIA DISTRIBUTION" filed on May 31, 2021, which are incorporated herein in their entirety.

The described techniques can allow for maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

A network such as a software defined network (SDN) may include one or more devices that process inbound and outbound packet traffic, transform the packets such as by applying policies to the packets, and forward the packets. Such processes may include applying a packet processing graph which may comprise, for example, checking the content against a series of tables or other data structures, pattern matching against each table, and so forth.

When a new flow starts (e.g., a flow defined by the source and destination address of a data packet), the device may modify some rows in some tables of the processing graph to treat that flow with specified rules that are applicable for that flow (e.g., perform network address translation). Such a process may include, for example, capturing a data packet, identifying the packet as the first packet of a flow, placing the packet in a queue, sending the packet to a processor, parsing the packet, identifying an action, determining which tables to modify, locking the tables, applying the changes, and forwarding the packet. Such processing can consume significant computing resources such as CPU cycles, memory resources, as well as introducing latency which can result in delays and/or missing subsequent data packets in the flow.

Thus one challenge is to be able to process new flows by executing the packet processing pipeline without significantly impacting the network throughput or latency. Modern cloud architectures typically offload networking stack tasks to implement policies such as tunneling for virtual networks, security, and load balancing. By offloading packet processing tasks to hardware devices such as a network interface card (NIC) and a field programmable gate array (FPGA), the capacity of CPU cores can be reserved for running cloud services and reducing latency and variability to network performance. However, the initial identification of data flows, porting information, and applicable policies are still performed by the hosts in software. This can result in a limit to the number of connections that can be processed.

Figure 1:
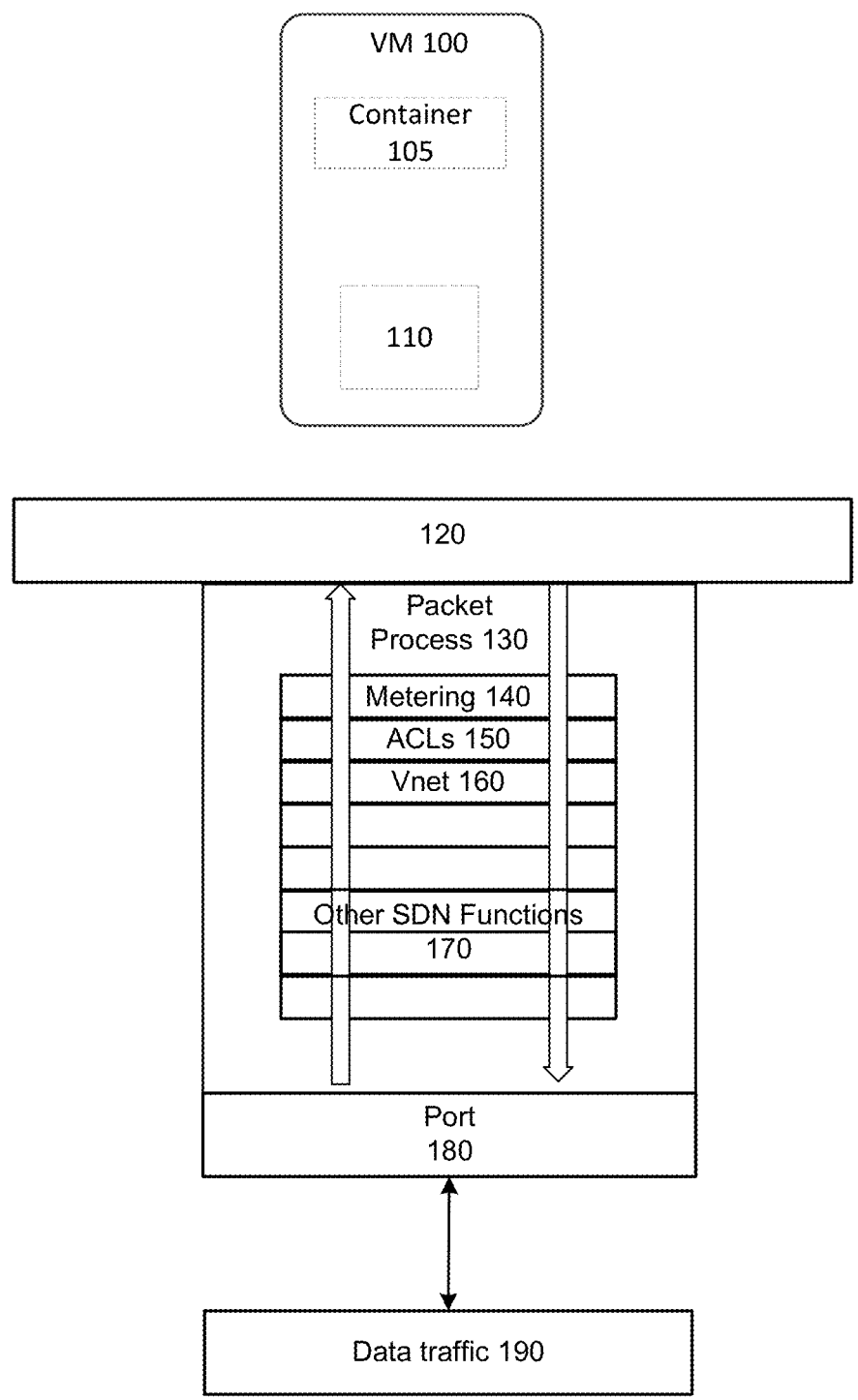
FIG. 1 is a diagram illustrating an example architecture in accordance with the present disclosure.

In various network scenarios, a packet networking device may operate on packets received from the network by applying a sequence of rules to the packet. FIG. 1 shows an example packet processing extension 130 for a network device 120 that applies various operations on packets, such as specific networking policies that are tied to container 105. The network device 120 may logically underly the NIC 110 and may provide a port 180 for each VM supported by the NIC 110. The packet processing extension 130 may apply policies and transform or tunnel data packets in a given computing workload that are entering and leaving the VM 100. The packet processing extension 130 may include a central data packet processor (not shown) that performs the processing of data packets. The packet processing layers may include, in this example, those relating to metering 140, access control lists (ACLs) 150, VNet addressing/routing 160, and other various SDN functions or features 170 which may include, for example, those pertaining to routing, tunneling, filtering, address translation, encryption, decryption, encapsulation, de-encapsulation, quality of service (QoS), and the like. The packet processing function in the packet processing extension 130 may evaluate the packets of data traffic 190 as they traverse the networking policy layers, matching rules in each layer based on a state of the packet after an action is performed in the preceding layer. Returning packets may traverse the layers in the opposite direction and may be processed by the packet processing extension 130 to match the applicable rules. The rules used to express the networking policies may be entities that perform actions on matching packets (e. g., using a match action table model) as the computing workload is processed by the packet processing extension 130.

In some examples, packet processing rules may be expressed in tables where the device examines specific bits within the packet and compares the values of those bits with the keys stored in the various rows in the table. The table rows may also contain actions to perform on packets that match against them and may indicate a subsequent table of rules to check. Different packets in general may visit a different sequence of tables. The collection of tables and the links between them may be referred to as the packet processing graph or a generic flow table (GFT).

In some implementations, such as in a device with a hardware data plane, the graph may be fixed by the network processing units (NPUs) and packets may be processed through the graph by the NPUs without involvement by the device's central processing units (CPUs). This may provide one way to route packets quickly by using specialized hardware designed and optimized only for this purpose. However, in a device with a software data plane, packets may be processed through the graph by threads running on one or more of the device's CPUs which are dedicated to this purpose. These may be referred to as the packet processing pipeline threads.

In some implementations, the first packet in a flow may be identified and the first packet may be removed from the software or hardware-based pipeline to be handled by a separate control thread on another CPU. A flow may be a set of related packets, for example all TCP packets sent between a specific pair of IP addresses and ports, which tend to need the same actions to be performed on them. The control thread analyzes the packet, constructs the changes required to the graph, and applies those changes to the graph. This may consume significant processing overhead and introduce delays. The packet must typically wait in a queue before being processed by the control thread. The control thread must then analyze the packet's properties and which part of the graph intercepted it. The control thread then creates a new part of the graph and must then wait for a lock on the graph to impose the changes. The amount of processing required to perform these operations can be significant and the resulting delay may prevent subsequent packets in the flow from being processed before the required change to the graph is in place.

Various embodiments disclosed herein enable a way for hardware-based network devices to perform processing of data flows including the initial identification of data flows, porting information, and applicable policies. Thus, the hardware-based network device can identify the first packet of a new data flow, maintain cache states for the new data flow, apply applicable policies for the data flow, process subsequent packets in the new data flow, and terminate application of the policies in the flow tables when the data flow is complete. The network device can perform these functions without the need to invoke software-based processing, causing undue delay and thus avoiding latency, possible packet loss, and limitations on new connections.

Systems and methods are described for providing a way for hardware-based network devices to perform processing of data flows including the initial identification of data flows, porting information, and applicable policies, where the hardware-based network device itself has the capability to identify the first packet of a new data flow, maintain cache states for the new data flow, apply applicable policies for the data flow, process subsequent packets in the new data flow, and terminate application of the policies in the flow tables when the data flow is complete.

In various embodiments, the hardware-based network device can perform these functions without the host platform setting up the policy for application to the data flow. In an embodiment, the policies and other configuration information for a flow can be represented using a standardized format. Furthermore, the representation may be provided via a programming interface, allowing for offloading of the necessary processing to be provided to hardware-based elements of the network or other device. The hardware-based elements may be configured to interpret and apply the received representation without involving the processing of software in the processing units, thus allowing for faster processing of the flows as compared to applying transformations in software. In one embodiment, this allows for the initial flow processing to be performed entirely in the data plane, resulting in a significant increase in the connections/sec that can be processed by the host network.

Further disclosed herein are methods for using an abstracted model of flow processing requirements to enable implementation in hardware-based components. Some network components such as NICs typically have processing cores and hardware-based accelerators. Conventionally, because of the complexity of many flows and packets associated with the flows, software-based approaches have been implemented to process flows as customer needs and use cases continue to evolve and cause continued iterations in lookups and combinations. With reference to FIG. 1, a typical data path for a packet may first have the packed processed in a software-based component. After the deep inspection and application of rules in the software-based component, the flow can be reflected in the GFTs. Only subsequent packets are hardware accelerated. The last packet of a flow may also be processed in the software-based component to handle the flow teardown and cleanup. Thus, in a typical network, the overhead associated with processing the first and last packets of a flow can limit the speed with which multiple flows can be processed. In particular, for customers who require thousands or millions of connections, the limitations can significantly impact performance.

Figure 2A:
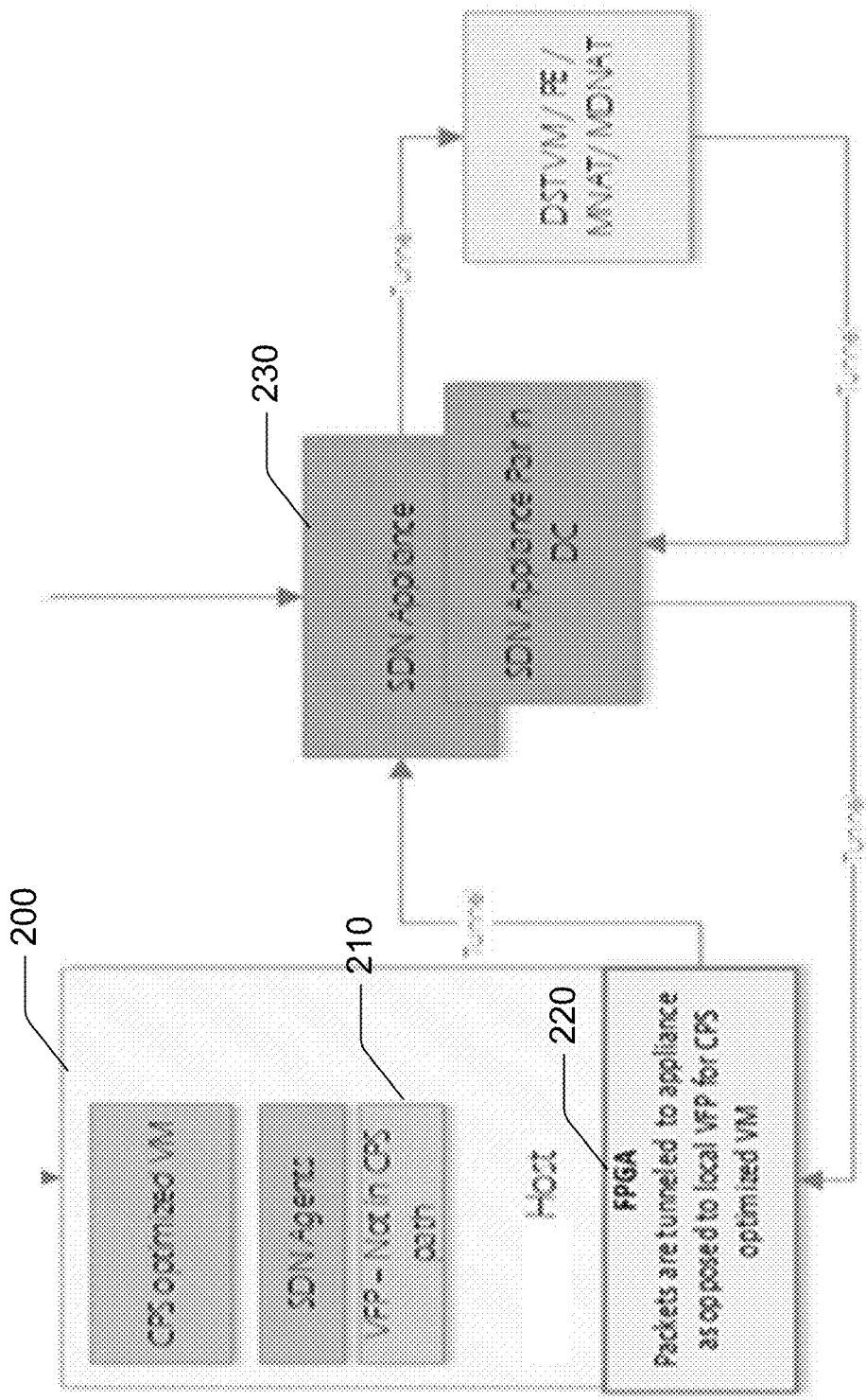
FIGS. 2A through 2N are diagrams illustrating example behavioral models in accordance with the present disclosure.

FIG. 2A illustrates one example implementation with a host 200 including a virtual filtering platform (VFP) 210 configured to perform policy enforcement, flow management, and packet transformation. While packet processing can be offloaded at FPGA 220 for established flows, for the first packet of a flow, the first packets can be tunneled to the SDN appliance. In one example, the FPGA 220 can forward such packets by encapsulating and forwarding the packets to an SDN appliance 230, which can process the packets entirely using hardware-based processing. As discussed further herein, the SDN appliance 230 may include the packet processing functionality as described herein. However, it should be understood that the disclosed functionality may be implemented using network and other devices, that are configured to provide the described functionality.

In various embodiments, requirements for packet processing as implemented in the virtual filtering platform (VFP) or other implementations of packet processing functions such as packet processing tables or graphs, may be represented as behavioral models.

A behavioral model may be determined for each flow type. In this way, a finite number of flows can be modeled and implemented in a hardware-based component for processing at hardware-based speeds, rather than using a software-based approach to accommodate an infinite array of possibilities.

A number of behavioral models may be selected that account for a threshold number or percentage of possible data flows. For example, a sufficient number of behavioral models may be implemented that can process 90% or 95% of data flows handled by the data center. The behavioral models can be determined based on, for example, the match/action and behavior of flows.

In some embodiments, the hardware-based component can be a flexible hardware engine or a specialized processor such as a network processing unit (NPU), programmable processor, and combinations of processors with a lookup engine, for example.

By implementing behavior models for known flows, the need to provide processing flexibility for all possible flows may be limited to those that can be implemented in hardware, allowing the hardware to process first and last packets for the majority of flows. By allowing hardware devices to increase the number of connections that they can support, a single device may be used to support multiple services, allowing for more efficient data center layouts.

In some embodiments a network device that implements a hardware-based behavior model may implement hardware-based logic that performs operations described below.

In some embodiments, an SDN appliance may be implemented which, as described herein, may be a multi-tenant network appliance, which supports virtual ports which can map to policy buckets corresponding to customer workloads, example: virtual machines, and bare metal servers.

Figure 2B:
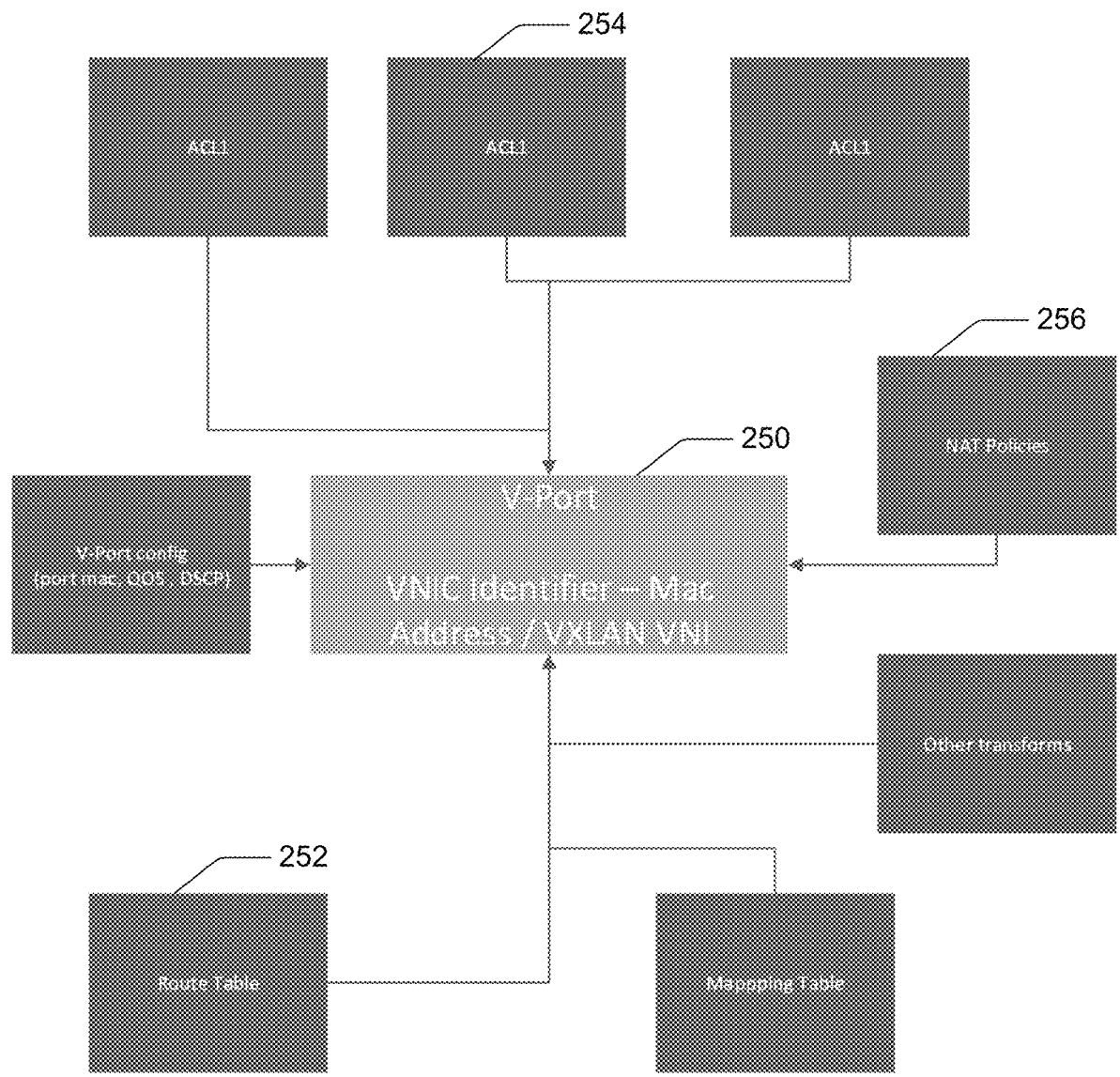

With reference to FIG. 2B, the SDN controller may create a virtual port 250 on the SDN appliance and associate corresponding SDN policies such as—route 252, ACL 254, NAT 256, etc. to the virtual port 250.

Each virtual port may be created with an elastic network interface (ENI) or flexible network interface (FNI) identifier such as—MAC address, VNI, or more.

The virtual port may be configured with attributes such as—flow time-out, QOS.

The virtual port may comprise the container which holds all applicable policies.

In response to receiving a packet, the network device may determine a matching identifier, for example the ENI. The packet direction and packet processing strategy based on determining the inner source MAC to determine the matching port identifier (e.g., for a virtual port, the ENI) and commence rule/flow processing.

When the identifier is matched, the packet may first be matched with a flow table to determine if any existing flow already matches the packet. If a flow match is found, the corresponding match action may be executed without performing rule processing. Flow match direction may be identified based on the source and destination MAC. If no flow match is found, a rule processing pipeline may be performed (e.g., the ENI rule processing pipeline).

The inbound rule processing pipeline may be executed if the destination MAC in the packet matches the MAC for the virtual port. Once the rule pipeline is executed, corresponding flows may be created.

The outbound rule processing pipeline may be executed if the source MAC in the packet matches the MAC for the virtual port. Once outbound rule processing is complete and final transforms are identified, a corresponding flow may be created in the flow table.

Depending on the implementation of flow table, a corresponding inbound flow may also be inserted so that response packets match the flow and do not have to go through the rule processing pipeline.

In one example: a virtual machine with IP 10.0.0.1 sends a packet to 8.8.8.8, the virtual machine inbound access control list (ACL) blocks all internet, the virtual machine outbound ACL allows 8.8.8.8—the response packet from 8.8.8.8 must be allowed without opening any inbound ACL due to the flow match.

Figure 2C:
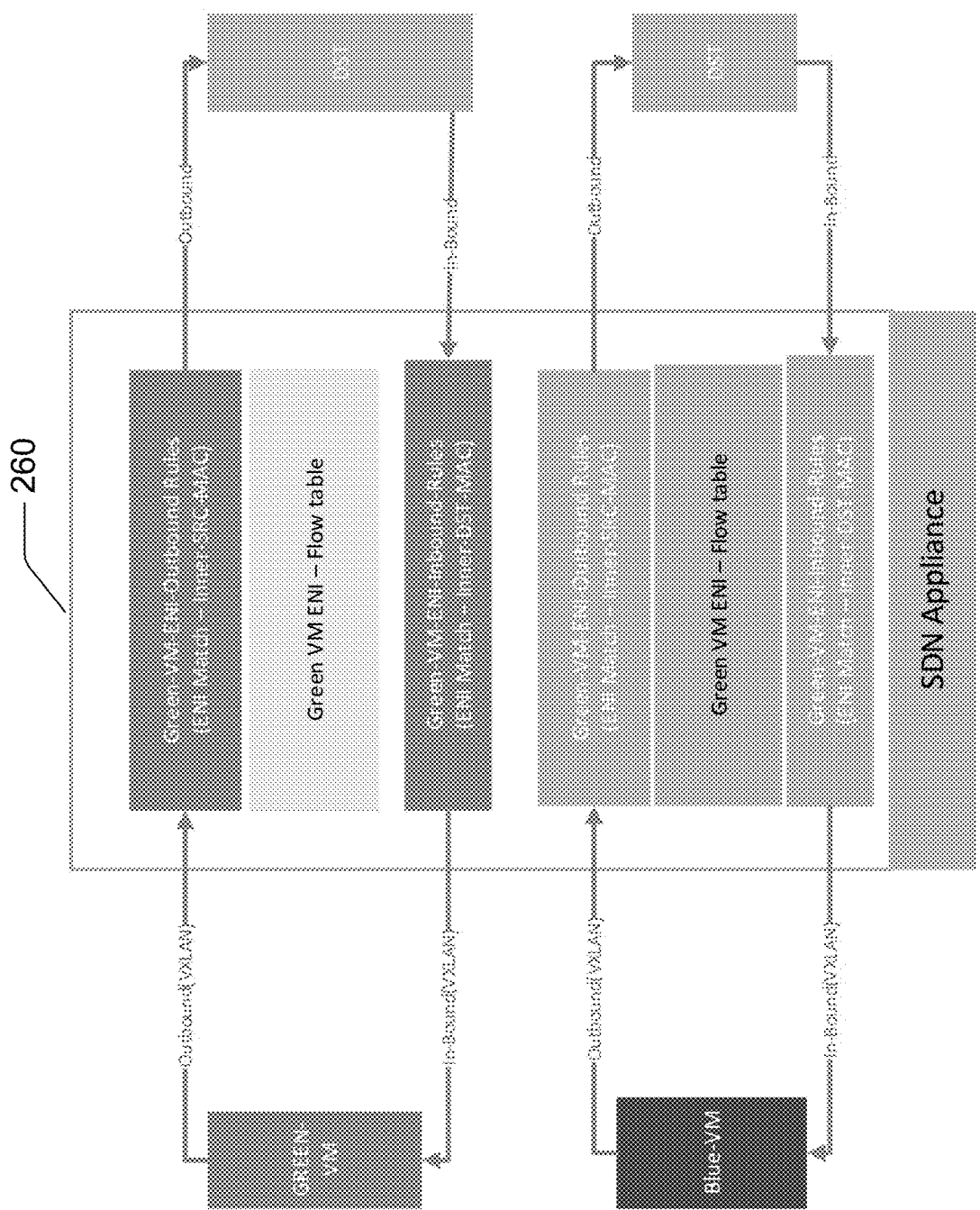

With reference to FIG. 2C, illustrated is a packet processing pipeline 260.

For the ACL:

The ACL pipeline has 3 levels, ACL decision is based on most restrictive match across all 3 levels.

If an ACL rule with bit exit ACL pipeline on hit is matched, the ACL pipeline is abandoned.

In the example below, the addresses may also be IPV6.

ACL_LEVEL1

Order of Evaluation/Priority of Evaluation

ACL_LEVEL1→ACL_LEVEL2

Test Scenarios and Expected Results

For simplicity the table below only has IP conditions, but same combinations exist for ports.

ACL rules are direction aware, below example is assuming a VM with source IP=10.0.0.100 is trying to send packets to various destinations and has above ACL rules on its v-port.

Outbound Traffic Example Evaluation and Outcome

| Source IP | Destination IP | Decision of ACL_LEVEL1 | Decision of ACL_LEVEL2 | Outcome |
|---|---|---|---|---|
| 10.0.0.100 | 10.0.0.200 | Allow (Terminating = false) | Allow (Terminating = false) | Allow |
| 100.0.0.100 | 100.0.0.201 | Block (Terminating = True) | Not evaluated or Ignored | Block |
| 100.0.0.100 | 100.0.0.202 | Allow (Terminating = True) | Not evaluated or Ignored | Allow |

| Source | Destination | Source Port | Destination Port | Protocol | Action | Priority | Exit ACL pipeline on hit? (Is Terminating) |
|---|---|---|---|---|---|---|---|
| 10.0.0.0/24, 20.0.0.0/24, 30.0.0.0/24 | 10.0.0.10/32 10.0.0.11/32 10.0.0.12/32 10.0.0.13/32 10.0.0.14/32 30.0.0.0/24 | * | * | TCP | Allow | 0 | No |
| 10.0.0.0/24, 20.0.0.0/24, 30.0.0.0/24 | 10.0.0.200/32 | * | * | TCP | Allow | 1 | No |
| 10.0.0.0/24, 20.0.0.0/24, 30.0.0.0/24 | 10.0.0.201/32 | * | * | TCP | Block | 2 | Yes |
| 10.0.0.0/24, 20.0.0.0/24, 30.0.0.0/24 | 10.0.0.202/32 | * | * | TCP | Allow | 3 | Yes |
| 10.0.0.0/24, 20.0.0.0/24, 30.0.0.0/24 | 10.0.0.203/32 | * | * | TCP | Allow | 4 | No |
| * | 8.8.8.8/32 | * | * | * | Block | 5 | Yes |
| * | 8.8.8.8/32 | * | * | * | Allow | 6 | Yes |
| * | 9.9.9.9/32 | * | * | * | Allow | 7 | Yes |
| * | * | * | * | * | Block | 8 | No |

ACL_LEVEL2

| Source | Destination | Source Port | Destination Port | Protocol | Action | Priority | Exit ACL pipeline on hit? (Is Terminating) |
|---|---|---|---|---|---|---|---|
| 10.0.0.0/24 | * | * | * | TCP | Allow | 1 | No |
| 10.0.0.0/24 | 10.0.0.202/32 | * | * | TCP | Block | 1 | Yes |
| 10.0.0.0/24 | 10.0.0.203/32 | * | * | TCP | Block | 1 | Yes |
| * | 8.8.8.8/32 | * | * | * | Allow | 2 | No |
| * | 9.9.9.9/32 | * | * | * | Block | 2 | Yes |
| * | 1.1.1.2/32 | * | * | * | Allow | 30 | No |
| * | * | * | * | * | Block | 3 | No |

| Source IP | Destination IP | Decision of ACL_LEVEL1 | Decision of ACL_LEVEL2 | Outcome |
|---|---|---|---|---|
| 100.0.0.100 | 100.0.0.203 | Allow (Terminating = false) | Block (Terminating = True) | Block |
| 100.0.0.100 | 8.8.8.8 | Block (Terminating = True) | Not evaluated or Ignored | Block |
| 100.0.0.100 | 1.1.1.1 | Block (Terminating = false) | Block (Terminating = false) | Block |
| 100.0.0.100 | 1.1.1.2 | Block (Terminating = false) | Allow (Terminating = false) | Allow |

Routes and Route-Action

| Route Type | Example |
|---|---|
| Encap_with_lookup_V4_underlay | Encap action is executed based on lookup into the mapping table. V4 underlay is used |
| Encap_with_lookup_V6_underlay | Encap action is executed based on lookup into the mapping table. V6 underlay is used |
| Encap_with_Provided_data | Encap action is executed based on provided data. |
| Outbound NAT (SNAT)_L3 | L3 NAT action is executed on source IP, based on provided data. |
| Outbound NAT (SNAT)_L4 | L4 NAT action is executed on source IP, source port based on provided data. |
| Null | Blocks the traffic |
| Private Link | — |

Mapping Table for a v-Port

| Customer Address | Physical Address-V4 | Physical Address-V6 | Mac-Address for D-Mac Rewrite | VNI to Use |
|---|---|---|---|---|
| 10.0.0.1 | 100.0.0.1 | 3ffe::1 | E4-A7-A0-99-0E-17 | 10001 |
| 10.0.0.2 | 100.0.0.2 | 3ffe::2 | E4-A7-A0-99-0E-18 | 10001 |
| 10.0.0.3 | 100.0.0.3 | 3ffe::3 | E4-A7-A0-99-0E-19 | 20001 |
| 10.0.0.4 | 100.0.0.4 | 3ffe::3 | E4-A7-A0-99-0E-20 | 10001 |

Route Table for a v-Port
LPM decides which route is matched.
Once route is matched corresponding action is executed.

| Route | Action | Route Type | Route Id |
|---|---|---|---|
| 10.0.0.0/24, 20.0.0.0/24, 30.0.0.0/24, 10.0.0.0/8, ... more prefixes (up-to 20k) | Encap Type: VXLAN, Action-lookup mapping table for exact destination, VNI and D-Mac re-write info. | Encap_with_lookup_V4_underlay | 1 |
| 10.0.0.100/32 | Encap Type: VXLAN Action: Encap_with_Provided_data Encap with source PA = 100.0.0.1 Encap with destination PA = 23.0.0.1 Re-write D-Mac to E4-A7-A0-99-0E-28 Use VNI = 90000 | Encap_with_Provided_data | 2 |
| 10.0.0.101/32 | Encap Type: VXLAN Action: Encap_with_Provided_data Encap with source PA = 100.0.0.1 Encap with destination PA = 23.0.0.10, 23.0.0.11, 23.0.0.13, 23.0.0.14 Re-write D-Mac to E4-A7-A0-99-0E-29 Use VNI = 90000 | Encap_with_Provided_data_ECMP | 3 |
| 8.8.8.8/32 | L3 NAT Action: Transpose source IP to provided NAT IP, keep all ports same. NAT IP: 10.0.0.1 -> 15.0.0.1 | Outbound NAT (SNAT)_L3 | 4 |
| 9.9.9.9/32 | L4 NAT Action: Transpose source IP and source port re-write ports from configured port pool. | Outbound NAT (SNAT)_L4 | 5 |
| 0.0.0.0/32 | NULL | Null | 6 |
| 23.0.0.1/32 | Service endpoint | ST | 7 |
| 23.0.0.2/32 | Private Link-TBD | Private Link-TBD | 8 |

Route Example—Outbound Packets

| Original Packet | Matched route | Transform | Route Type |
|---|---|---|---|
| 10.0.0.1 -> 10.0.0.2 SMAC1-> DMAC_FAKE Outer: SRC: [Physical IP of host] DST: [Physical IP of SDN Appliance] VXLAN VNI: custom Inner Mac: SRC-SMAC1 DST-DMAC_FAKE Inner IP: [10.0.0.1] -> [10.0.0.2] | Route Id = 1 | Outer: SRC: [SDN Appliance IP] DST: [100.0.0.2] # Came from mapping table lookup VXLAN VNI: 10001 Inner Mac: SRC-SMAC1 DST-E4-A7-A0-99-0E-18 Inner IP: [10.0.0.1] -> [10.0.0.2] | Encap_with_lookup_V4_underlay |
| 10.0.0.1 -> 10.0.0.100 SMAC1-> DMAC_FAKE Outer: SRC: [Physical IP of host] DST: [Physical IP of SDN Appliance] VXLAN VNI: custom Inner Mac: SRC-SMAC1 DST-DMAC_FAKE Inner IP: [10.0.0.1] -> [10.0.0.2] | Route Id = 2 | Outer: SRC: [SDN Appliance IP] DST: [23.0.0.1] # Came from mapping table lookup VXLAN VNI: 90000 Inner Mac: SRC-SMAC1 DST-E4-A7-A0-99-0E-28 Inner IP: [10.0.0.1] -> [10.0.0.100] | Encap_with_Provided_data |
| 10.0.0.1 -> 10.0.0.101 SMAC1-> DMAC_FAKE Outer: SRC: [Physical IP of host] | Route Id = 3 | Outer: SRC: [SDN Appliance IP] DST: ECMP on [23.0.0.10, 23.0.0.11, | Encap_with_Provided_data_ECMP |

-continued

| Original Packet | Matched route | Transform | Route Type |
|---|---|---|---|
| DST: [Physical IP of SDN Appliance] VXLAN VNI: custom Inner Mac: SRC-SMAC1 DST-DMAC_FAKE Inner IP: [10.0.0.1] -> [10.0.0.2] | | 23.0.0.13, 23.0.0.14] # Came from mapping table lookup VXLAN VNI: 90000 Inner Mac: SRC-SMAC1 DST-E4-A7-A0-99-0E-29 Inner IP: [10.0.0.1] -> [10.0.0.100] | |
| 10.0.0.1 -> 8.8.8.8 SMAC1-> DMAC_FAKE Outer: SRC: [Physical IP of host] DST: [Physical IP of SDN Appliance] VXLAN VNI: custom Inner Mac: SRC-SMAC1 DST-DMAC_FAKE Inner IP: [10.0.0.1] -> [S.8.8.8] | Route Id = 4 | | |

Figure 2D:
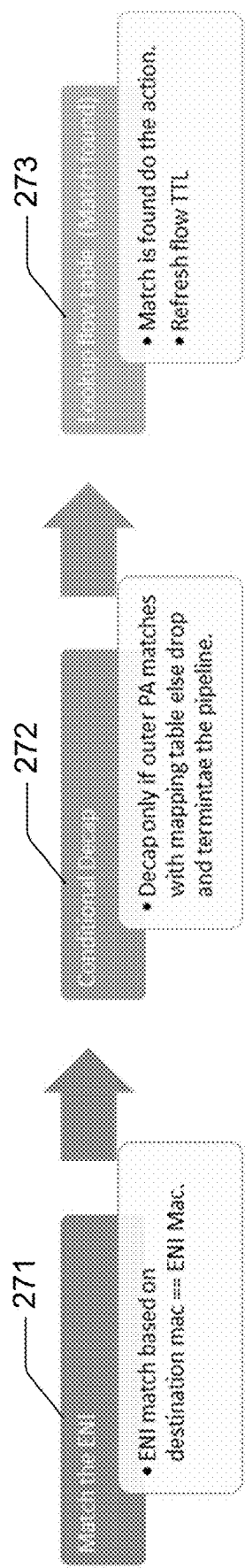

In the example shown in FIG. 2D, illustrated is an example of inbound packet flow, for fast path—flow match. The ENI may be matched 271, which may be made based on the destination MAC. The packet may be conditionally decapsulated 272 based on whether the outer physical address (PA) matches with the mapping table. Otherwise, the packet is dropped and the pipeline is terminated. The flow table may be matched 273, where the action is performed and the flow TTL may be refreshed.

Figure 2E:
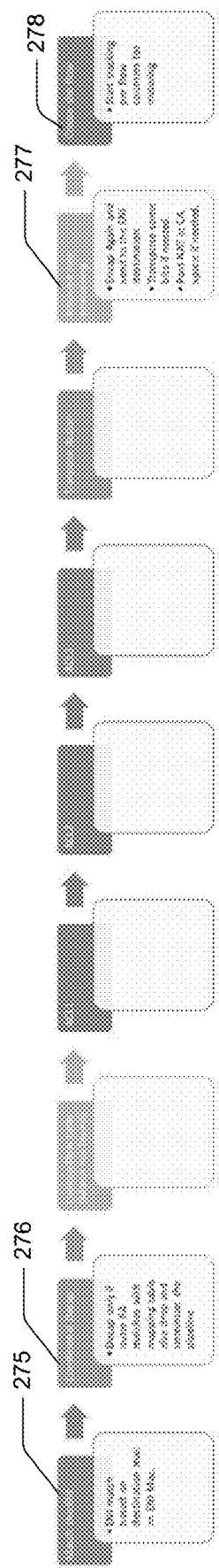

In the example shown in FIG. 2E, illustrated is an example of inbound packet flow, for slow path—no flow match. The ENI may be matched 275, which may be made based on the destination MAC. The packet may be conditionally decapsulated 276 based on whether the outer physical address (PA) matches with the mapping table. Otherwise, the packet is dropped and the pipeline is terminated. Additional actions may be performed as shown. Inbound rule processing may be performed 277, and the flow may be created 278.

Figure 2F:
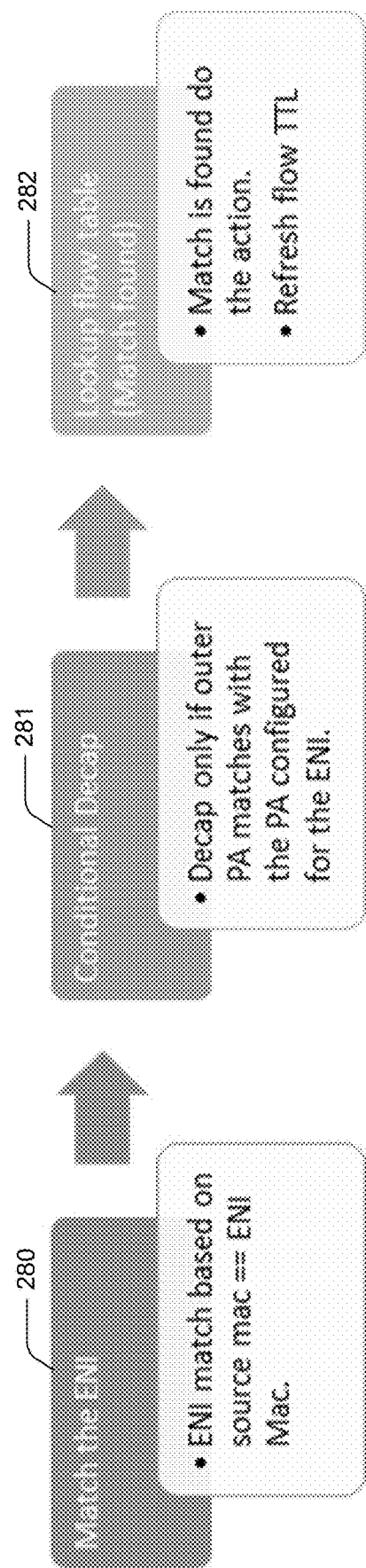

In the example shown in FIG. 2F, illustrated is an example of outbound packet flow, for fast path—flow match. The ENI may be matched 280, which may be made based on the source MAC. The packet may be conditionally decapsulated 281 based on whether the outer physical address (PA) matches with the PA configured for the ENI. The flow table may be matched 282, where the action is performed and the flow TTL may be refreshed.

Figure 2G:
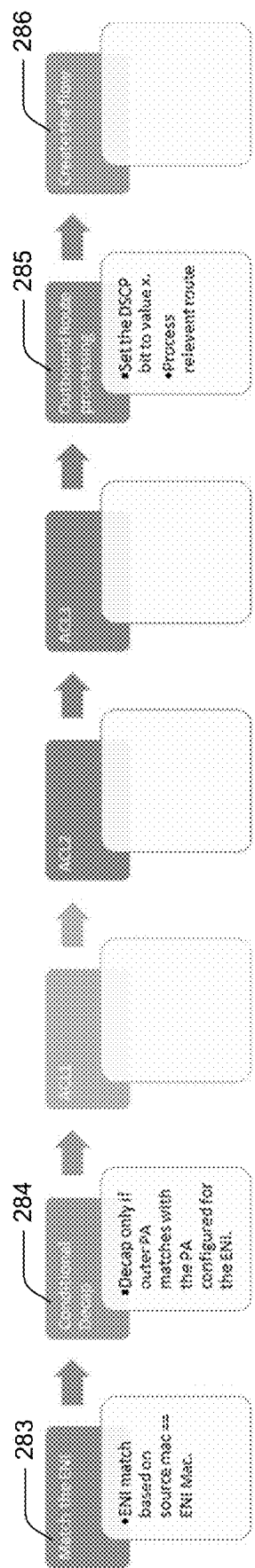

In the example shown in FIG. 2G, illustrated is an example of outbound packet flow, for slow path—no flow match. The ENI may be matched 283, which may be made based on the source MAC. The packet may be conditionally decapsulated 284 based on whether the outer physical address (PA) matches with the PA configured for the ENI. Additional actions may be performed as shown. Outbound route processing may be performed 285, and the flow may be created 286.

Various examples of packet transforms are provided herein.

VNET to VNET Traffic
V-Port
Physical address=100.0.0.2
V-Port Mac=V-PORT MAC
VNET Definition:
10.0.0.0/24
20.0.0.0/24
VNET Mapping Table

| V4 underlay | V6 underlay | Mac-Address | Mapping Action | VNI |
|---|---|---|---|---|
| 10.0.0.1 | 100.0.0.1 | 3ffe::1 | Mac1 | VXLAN_ENCAP_WITH_DMAC_DE-WRITE | 100 |
| 10.0.0.2 | 100.0.0.2 | 3ffe::2 | Mac2 | VXLAN_ENCAP_WITH_DMAC_DE-WRITE | 200 |
| 10.0.0.3 | 100.0.0.3 | 3ffe::3 | Mac3 | VXLAN_ENCAP_WITH_DMAC_DE-WRITE | 300 |

Packet Transforms

| SRC -> DST | Out-ACL1 | Out-ACL2 | Out-ACL3 | Routing | Final |
|---|---|---|---|---|---|
| | Block 10.0.0.10 Allow * | Block 10.0.0.11 Allow * | Allow * | 10.0.0.0/24-Route Action = VNET 20.0.0.0/24-Route Action = VNET | |
| 10.0.0.1 -> 10.0.0.10 SMAC1-> DMAC_FAKE | Block | | | | Blocked |
| 10.0.0.1 -> 10.0.0.11 SMAC1-> DMAC_FAKE | Allow | Block | | | Blocked |
| 10.0.0.1 -> 10.0.0.2 | Allow | Allow | Allow | Matched LPM | Highlighted the changes in |

-continued

| SRC -> DST | Out-ACL1 | Out-ACL2 | Out-ACL3 | Routing | Final |
|---|---|---|---|---|---|
| SMAC1-> DMAC_FAKE Outer: SRC: [Physical IP of host] DST: [Physical IP of SDN Appliance] VXLAN VNI: custom Inner Mac: SRC-SMAC1 DST-DMAC_FAKE Inner IP: [10.0.0.1] -> [10.0.0.2] 10.0.0.1 -> 10.0.0.3 SMAC1-> DMAC_FAKE | | | | route 10.0.0.0/24. Execute action VNET-which will lookup in mapping table and take mapping action. | packet. Outer: SRC: [100.0.0.2] DST: [100.0.0.1] VXLAN VNI: 200 Inner Mac: SRC-SMAC1 DST-Mac1 Inner IP: [10.0.0.1] -> [10.0.0.2] |

FIGS. 2H through 2N and FIG. 3 illustrate examples of behavioral models.

Figure 2H:
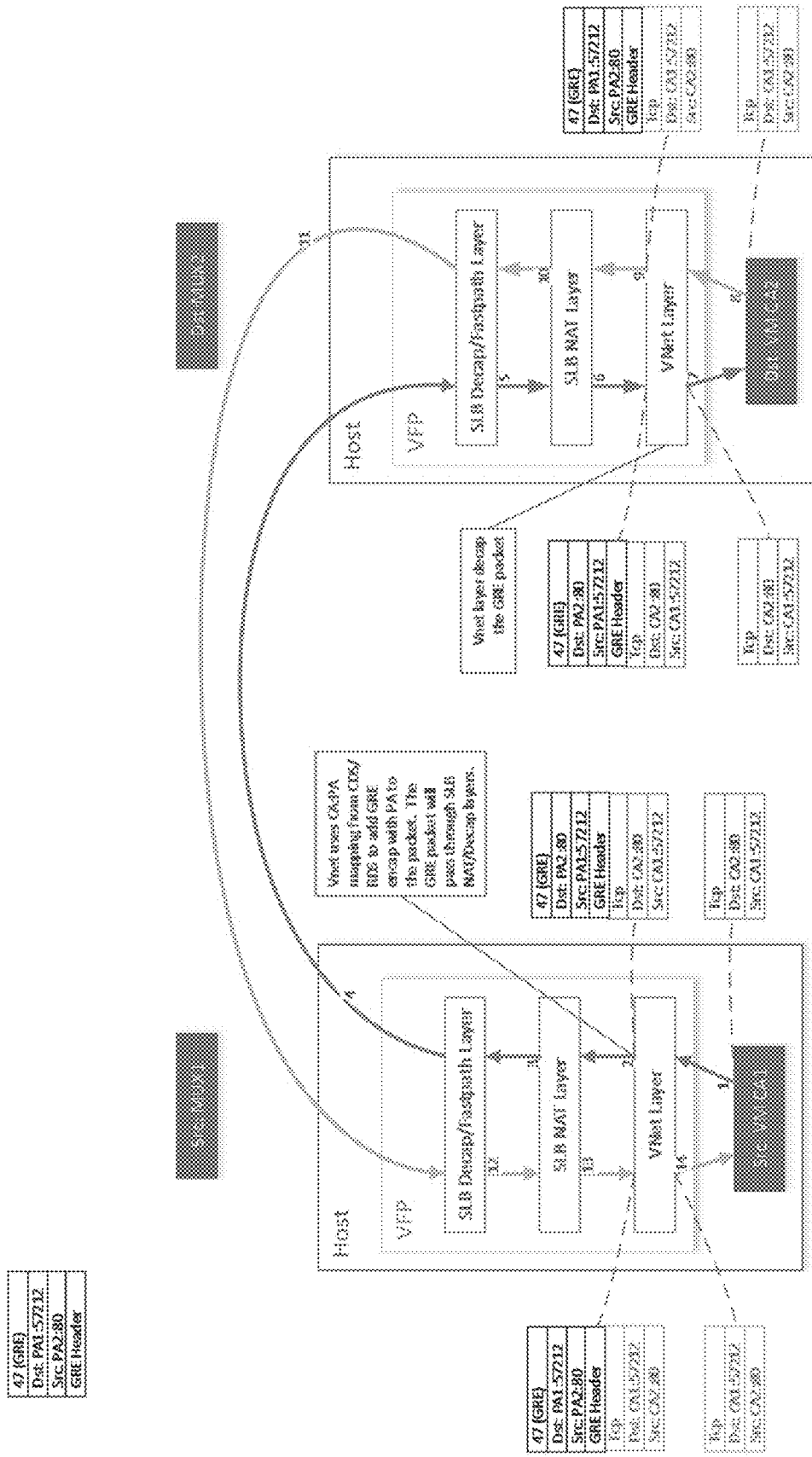

FIG. 2H illustrates a VM-VM (in VNet) scenario.

In the example shown in FIG. 2H, a VM to VM communication using a VNET is illustrated. In particular, the example shows communication from a source VM to a destination VM. The VFP path shows three processing layers and header information used during encapsulation. For the first packet of a flow, the transformed header that encapsulates the packet with the original header may be determined, which can then be provided to hardware-based accelerators for subsequent packets of the flow. Additionally, various rules may be applied to determine that the flow adheres to applicable policies.

FIG. 2J illustrates a VM-Internal Load Balancer communication.

FIG. 2K illustrates a private link scenario.

Figure 2L:
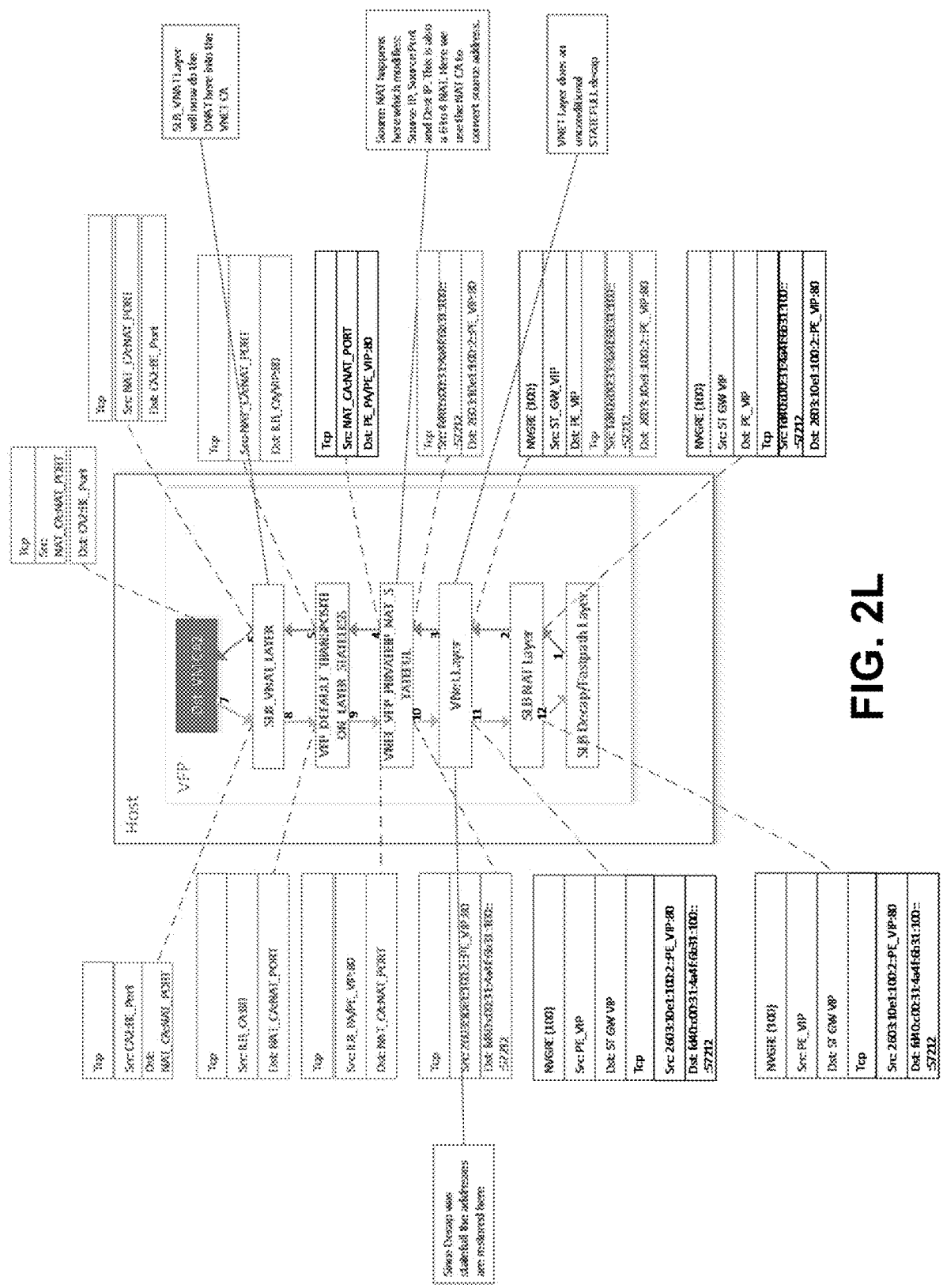

FIG. 2L illustrates a private link service scenario.

Figure 2M:
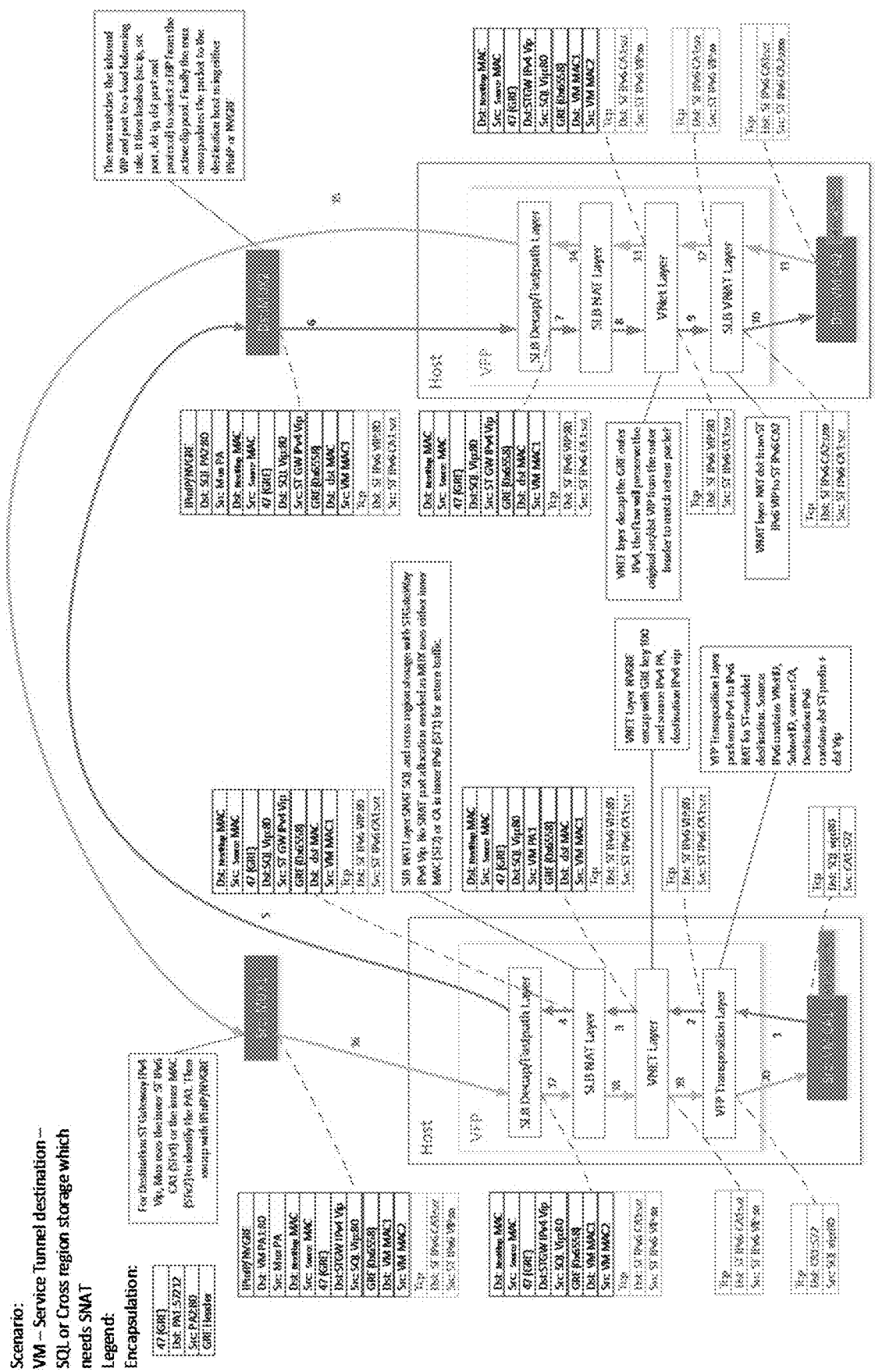
Figure 2N:
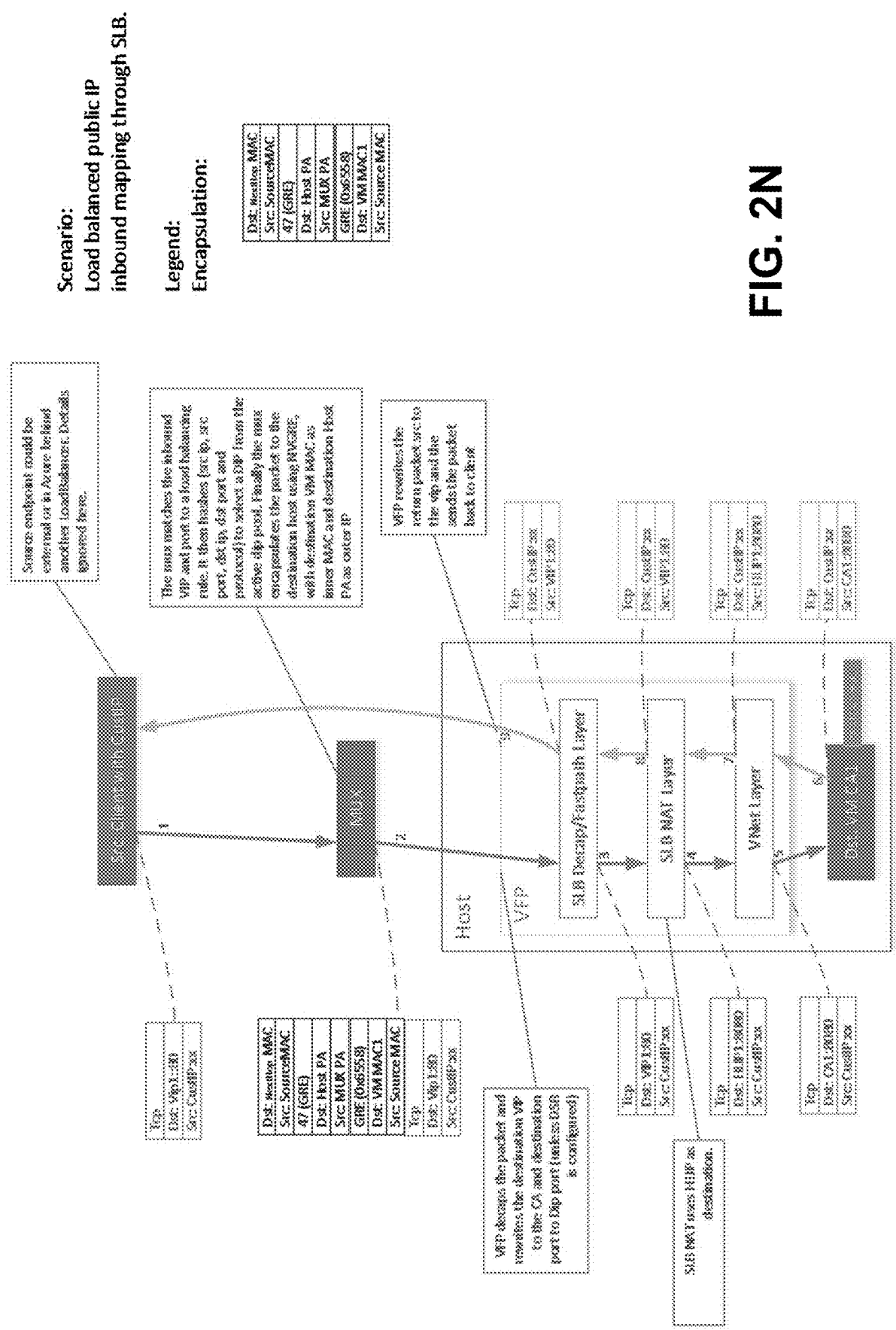

FIG. 2M illustrates a VM-service tunnel destination scenario, wherein SQL or cross region storage needs SNAT FIG. 2N illustrates an inbound from load balancer scenario.

Figure 3:
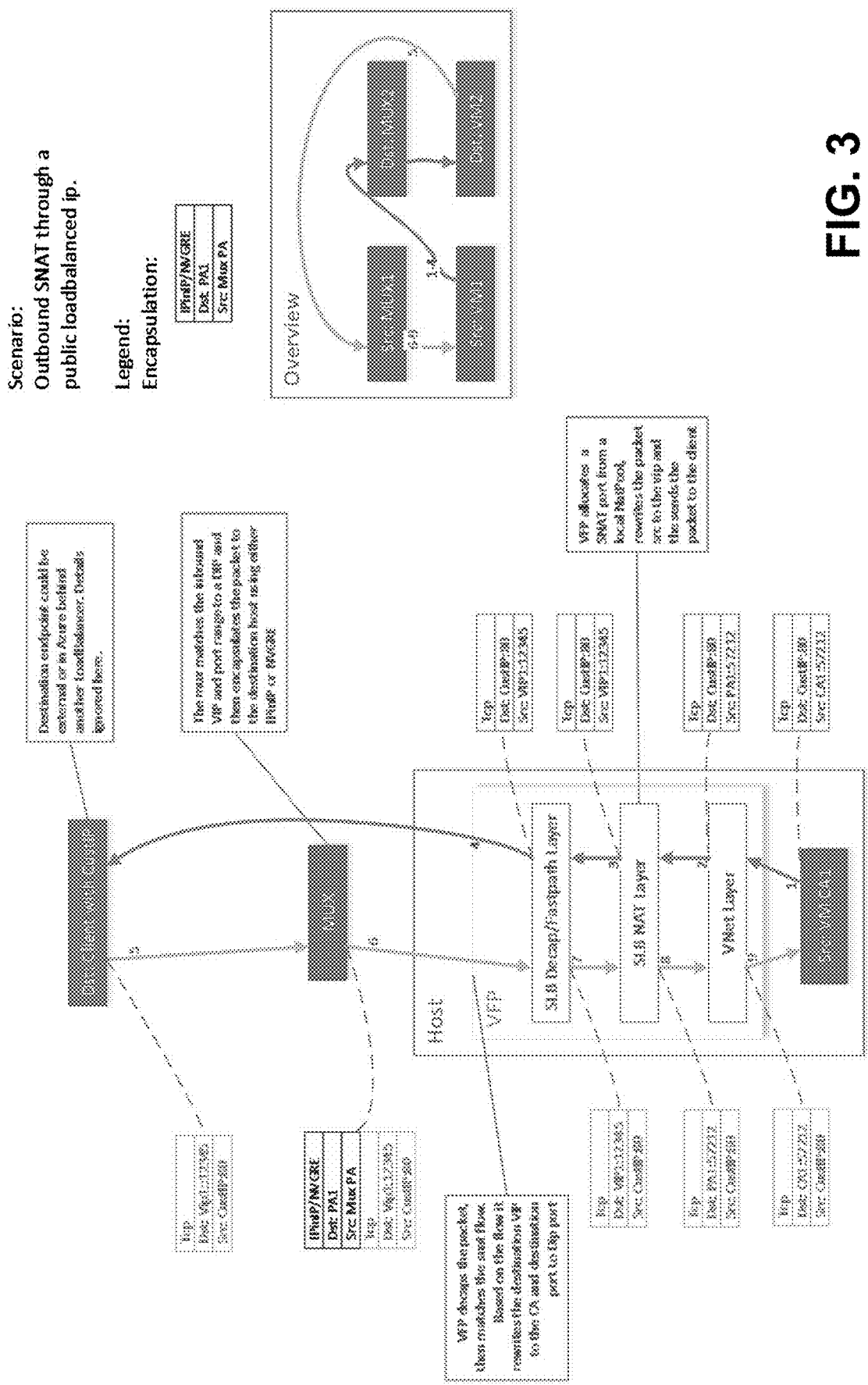
FIG. 3 is a diagram illustrating an example behavioral model in accordance with the present disclosure.

FIG. 3 illustrates an outbound SNAT through a public load-balanced IP scenario.

Figure 4:
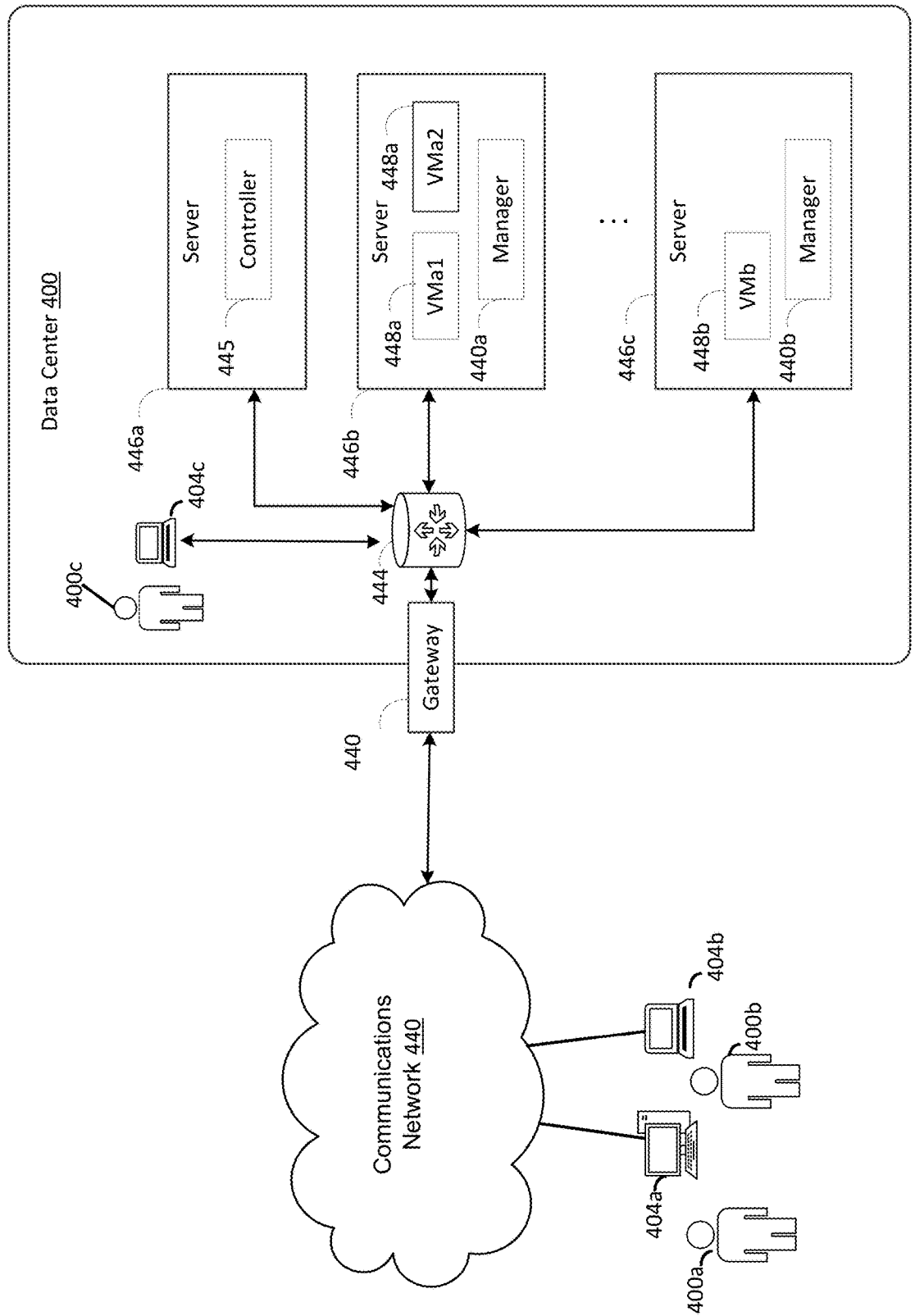
FIG. 4 is a flowchart depicting an example computing environment in accordance with the present disclosure.

FIG. 4 illustrates an example computing environment in which the embodiments described herein may be implemented. FIG. 4 illustrates a data center 400 that is configured to provide computing resources to users 400a, 400b, or 400c (which may be referred herein singularly as "a user 400" or in the plural as "the users 400") via user computers 404a, 404b, and 404c (which may be referred herein singularly as "a computer 404" or in the plural as "the computers 404") via a communications network 440. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may correspond to data center 100 and 110 of FIG. 2. Data center 400 may include servers 446a, 446b, and 446c (which may be referred to herein singularly as "a server 446" or in the plural as "the servers 446") that may be standalone or installed in server racks, and provide computing resources available as virtual machines 448a and 448b (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 445. Controller 445 may be a fabric controller or another type of program configured to manage the allocation of virtual machines on servers 446.

Referring to FIG. 4, communications network 440 may, for example, be a publicly accessible network of linked networks and may be operated by various entities, such as the Internet. In other embodiments, communications network 440 may be a private network, such as a corporate network that is wholly or partially inaccessible to the public.

Communications network 440 may provide access to computers 404. Computers 404 may be computers utilized by users 400. Computer 404a, 404b or 404c may be a server, a desktop or laptop personal computer, a tablet computer, a smartphone, a set-top box, or any other computing device capable of accessing data center 400. User computer 404a or 404b may connect directly to the Internet (e.g., via a cable modem). User computer 404c may be internal to the data center 400 and may connect directly to the resources in the data center 400 via internal networks. Although only three user computers 404a, 404b, and 404c are depicted, it should be appreciated that there may be multiple user computers.

Computers 404 may also be utilized to configure aspects of the computing resources provided by data center 400. For example, data center 400 may provide a Web interface through which aspects of its operation may be configured through the use of a Web browser application program executing on user computer 404. Alternatively, a stand-alone application program executing on user computer 404 may be used to access an application programming interface (API) exposed by data center 400 for performing the configuration operations.

Servers 446 may be configured to provide the computing resources described above. One or more of the servers 446 may be configured to execute a manager 440a or 440b (which may be referred herein singularly as "a manager 440" or in the plural as "the managers 440") configured to execute the virtual machines. The managers 440 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein.

In the example data center 400 shown in FIG. 4, a network device 444 may be utilized to interconnect the servers 446a and 446b. Network device 444 may comprise one or more switches, routers, or other network devices. Network device 444 may also be connected to gateway 440, which is connected to communications network 440. Network device 444 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 5:
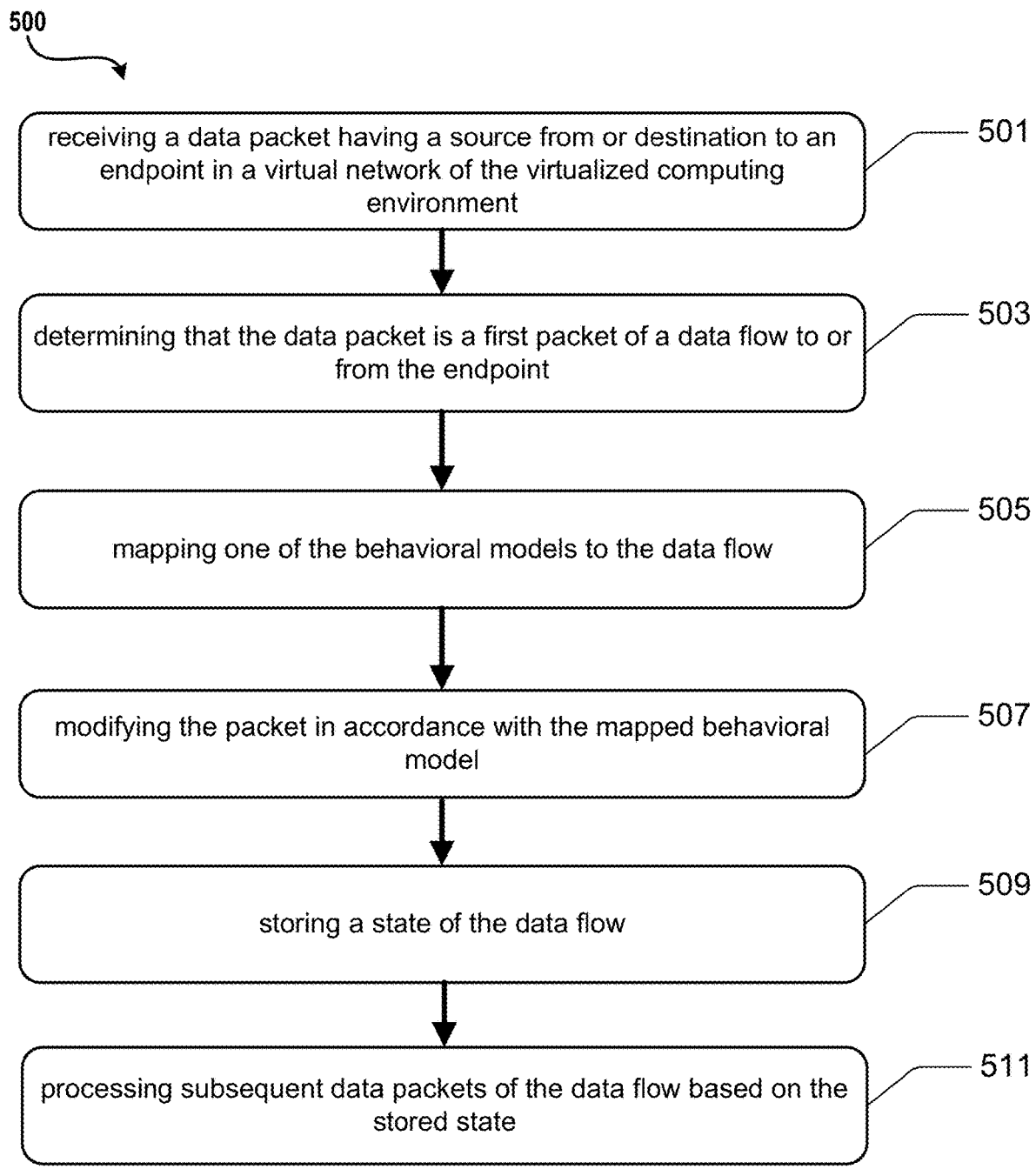
FIG. 5 is a flowchart depicting an example procedure in accordance with the present disclosure.

Turning now to FIG. 5, illustrated is an example operational procedure for processing data packets in a virtualized computing environment in accordance with the present disclosure. Such an operational procedure can be provided by one or more components illustrated in FIGS. 1-4 and 6. The operational procedure may be implemented by a hardware-based networking device configured to disaggregate processing of data packets from hosts of the virtualized computing environment. In an embodiment, the hardware-based networking device comprises a hardware-based component implementing a plurality of behavioral models indicative of packet processing graphs for data flows in the virtualized computing environment. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 5, operation 501 illustrates receiving, by the hardware-based networking device, a data packet having a source from or destination to an endpoint in a virtual network of the virtualized computing environment.

Operation 501 may be followed by operation 503. Operation 503 illustrates determining that the data packet is a first packet of a data flow to or from the endpoint.

Operation 503 may be followed by operation 505. Operation 505 illustrates based on the determination, mapping one of the behavioral models to the data flow.

Operation 505 may be followed by operation 507. Operation 507 illustrates modifying the packet in accordance with the mapped behavioral model. In an embodiment, the mapped behavioral model is processed in the hardware-based component.

Operation 507 may be followed by operation 509. Operation 509 illustrates storing a state of the data flow.

Operation 509 may be followed by operation 511. Operation 511 illustrates processing subsequent data packets of the data flow based on the stored state.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
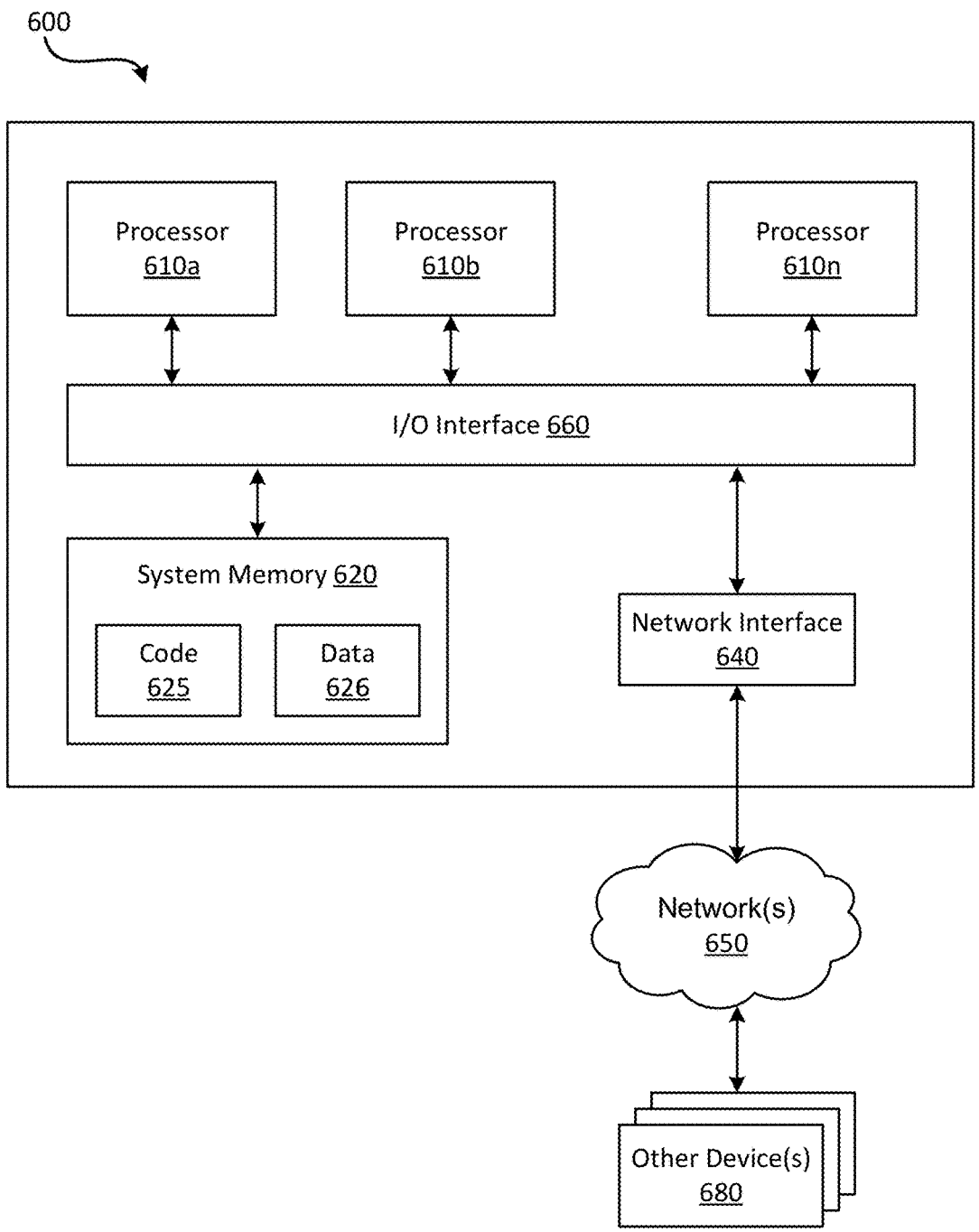
FIG. 6 is an example computing device in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 66 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 66 may be configured to store instructions and data accessible by processor(s) 610. In various embodiments, system memory 66 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 66, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 660, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for processing data packets in a virtualized computing environment by a hardware-based networking device configured to disaggregate processing of data packets from hosts of the virtualized computing environment, the hardware-based networking device comprising a hardware-based component implementing a plurality of behavioral models indicative of packet processing graphs for data flows in the virtualized computing environment, the method comprising:

receiving, by the hardware-based networking device, a data packet having a source from or destination to an endpoint in a virtual network of the virtualized computing environment;

determining that the data packet is a first packet of a data flow to or from the endpoint;

based on the determination, mapping one of the behavioral models to the data flow;

modifying the packet in accordance with the mapped behavioral model, wherein the mapped behavioral model is processed in the hardware-based component;

storing a state of the data flow; and processing subsequent data packets of the data flow based on the stored state.

Clause 2: The method of clause 1, further comprising:

determining that a received subsequent data packet is a last packet of the data flow; and in response to the determination, removing the state of the data flow.

Clause 3: The method of any of clauses 1-2, wherein the plurality of behavioral models comprises a threshold number or percentage of data flows of the virtualized computing environment.

Clause 4: The method of any of clauses 1-3, wherein the hardware-based component is one of a flexible hardware engine, specialized processor, or programmable circuit.

Clause 5: The method of any of clauses 1-4, wherein the hardware-based component comprises an inbound packet processing pipeline and outbound packet processing pipeline.

Clause 6: The method of any of clauses 1-5, wherein the flows are stored in the hardware-based component in a GFT.

Clause 7: The method of clauses 1-6, wherein the hardware-based component comprises one or more of a NAT layer, VNET layer, a decapsulation layer, or transposition layer.

Clause 8: The method of any of clauses 1-7, wherein the inbound packet processing pipeline and outbound packet processing pipeline comprise an ACL pipeline.

Clause 9: A hardware-based networking device configured to disaggregate processing of data packets from hosts of a virtualized computing environment, the hardware-based networking device comprising a hardware-based component implementing a plurality of behavioral models indicative of packet processing graphs for data flows in the virtualized computing environment, the hardware-based networking device configured to:

receive a data packet having a source from or destination to an endpoint in a virtual network of a virtualized computing environment;

determine that the data packet is a first packet of a data flow to or from the endpoint;

based on the determination, map one of the behavioral models to the data flow;

modify the packet in accordance with the mapped behavioral model, wherein the mapped behavioral model is processed in the hardware-based component;

store a state of the data flow; and process subsequent data packets of the data flow based on the stored state.

Clause 10: The hardware-based networking device of clause 9, wherein the hardware-based networking device is further configured to perform packet transformation for VNET to VNET data traffic.

Clause 11: The hardware-based networking device of any of clauses 9 and 10, wherein the hardware-based networking device is further configured to perform packet transformation for load balancer traffic.

Clause 12: The hardware-based networking device of any clauses 9-11, wherein the hardware-based networking device is further configured to perform packet transformation for private link traffic.

Clause 13: The hardware-based networking device of any clauses 9-12, wherein the hardware-based networking device is further configured to perform packet transformation for service tunneling.

Clause 14: The hardware-based networking device of any clauses 9-13, wherein the hardware-based networking device is further configured to perform packet transformation for one or more of VNET encryption, telemetry, BGP, debugging, or flow replication.

Clause 15: The hardware-based networking device of any clauses 9-14, wherein the hardware-based networking device is further configured to:

determine that a received subsequent data packet is a last packet of the data flow; and in response to the determination, remove the state of the data flow.

Clause 16: A computing environment comprising a plurality of computing devices and one or more hardware-based networking devices configured to disaggregate processing of data packets from the plurality of computing devices, the hardware-based networking device comprising a hardware-based component implementing a plurality of behavioral models indicative of packet processing graphs for data flows in the computing environment, the hardware-based networking device configured to:

receive a data packet having a source from or destination to an endpoint in a virtual network of a virtualized computing environment;

determine that the data packet is a first packet of a data flow to or from the endpoint;

based on the determination, map one of the behavioral models to the data flow;

modify the packet in accordance with the mapped behavioral model, wherein the mapped behavioral model is processed in the hardware-based component;

store a state of the data flow; and process subsequent data packets of the data flow based on the stored state.

Clause 17: The computing environment of clause 16, wherein the plurality of behavioral models comprises a threshold number or percentage of data flows of the virtualized computing environment.

Clause 18: The computing environment of any of clauses 16 and 17, wherein the hardware-based component is one of a flexible hardware engine, specialized processor, or programmable circuit.

Clause 19: The computing environment of any of the clauses 16-18, wherein the hardware-based component comprises an inbound packet processing pipeline and outbound packet processing pipeline.

Clause 20: The computing environment of any of the clauses 16-19, wherein the flows are stored in the hardware-based component in a GFT. The disclosure presented herein also encompasses the subject matter set forth in the following clauses:

Clause 1: A method for processing data packets and implementing policies in a software defined network (SDN) of a virtual computing environment, by at least one SDN appliance configured to disaggregate enforcement of policies of the SDN from hosts of the virtual computing environment, the hosts implemented on servers communicatively coupled to network interfaces of the SDN appliance, the servers hosting a plurality of virtual machines, the SDN appliance comprising a plurality of smart network interface cards (sNICs) configured to implement functionality of the SDN appliance, the method comprising:

receiving, at the SDN appliance from a device that is remote from the virtual computing environment, a data packet addressed to an endpoint in a virtual network hosted by one of the virtual machines, the data packet comprising an identifier indicative of the remote device;

based on the identifier:

determining that the data packet is associated with the virtual network; and based on the determined association, mapping one of a plurality of policies to a data flow of the virtual network;

modifying, by the SDN appliance, the packet in accordance with the mapped policy; wherein the mapped policy is dynamically adjustable based on the data flow; and forwarding the modified packet to the endpoint in the virtual network.

Clause 2: The method of clause 1, wherein the SDN appliance is implemented as a distributed appliance where the sNICs are physically distributed among the servers.

Clause 3: The method of any of clauses 1-2, wherein the SDN appliance is implemented as two physical devices that are communicatively coupled to at least two top-of-rack switches, the servers communicatively coupled to network interfaces of the top-of-rack switches so that each of the servers have a switchable communications path to each sNIC of the physical devices.

Clause 4: The method of any of clauses 1-3, wherein storage traffic bypasses the sNICs.

Clause 5: The method of any of clauses 1-4, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 6: The method of any of clauses 1-5, wherein at least two top-of-rack switches are configured with SDN agents configured to manage functionality of the SDN appliance.

Clause 7: A system comprising:

a plurality of servers communicatively coupled to at least one software defined network (SDN) appliance configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the SDN appliance comprising a plurality of smart network interface cards (sNICs) configured to implement functionality of the SDN appliance;

the system configured to:

receive, from a device that is remote from the virtual computing environment, a data packet addressed to an endpoint in a virtual network hosted by one of the virtual machines, the data packet comprising an identifier indicative of the remote device;

based on the identifier:

determining that the data packet is associated with the virtual network; and based on the determined association, mapping one of a plurality of policies to a data flow of the virtual network;

modifying, by the SDN appliance, the packet in accordance with the mapped policy; wherein the mapped policy is dynamically adjustable based on the data flow; and forwarding the modified packet to the endpoint in the virtual network.

Clause 8: The system of clause 7, wherein the SDN appliance is implemented as a distributed appliance where the sNICs are physically distributed among the plurality of servers.

Clause 9: The system of any of clauses 7 and 8, wherein the SDN appliance is implemented as two physical devices that are communicatively coupled to at least two top-of-rack switches, the servers communicatively coupled to network interfaces of the top-of-rack switches so that each of the servers have a switchable communications path to each sNIC of the physical devices.

Clause 10: The system of any clauses 7-9, wherein storage traffic bypasses the sNICs.

Clause 11: The system of any clauses 7-10, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 12: The system of any clauses 7-11, wherein at least two top-of-rack switches are configured with SDN agents configured to manage functionality of the SDN appliance.

Clause 13: The system of any clauses 7-12, wherein the policy is applied at selectively placed network hops in the virtual network.

Clause 14: The system of any clauses 7-13, wherein the SDN appliance is configured to apply policies of the virtual computing environment to data traffic on the virtual network after the data traffic leaves its source and before the data traffic reaches its destination.

Clause 15: A data center rack comprising:

a plurality of servers; the servers communicatively coupled to at least one software defined network (SDN) appliance configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the SDN appliance comprising a plurality of smart network interface cards (sNICs) configured to implement functionality of the SDN appliance;

the data center rack configured to:

receive, from a device that is remote from a software defined network (SDN) of a virtual computing environment, a data packet addressed to an endpoint in a virtual network hosted by one of the virtual machines, the data packet comprising an identifier indicative of the remote device;

based on the identifier:

determining that the data packet is associated with the virtual network; and based on the determined association, mapping one of a plurality of policies to a data flow of the virtual network;

modifying, by the SDN appliance, the packet in accordance with the mapped policy; wherein the mapped policy is dynamically adjustable based on the data flow; and forwarding the modified packet to the endpoint in the virtual network.

Clause 16: The computing environment of clause 15, wherein the SDN appliance is implemented as a distributed appliance where the sNICs are physically distributed among the plurality of servers.

Clause 17: The computing environment of any of clauses 15 and 16, wherein the SDN appliance is implemented as two physical devices that are communicatively coupled to at least two top-of-rack switches, the servers communicatively coupled to network interfaces of the top-of-rack switches so that each of the servers have a switchable communications path to each sNIC of the physical devices.

Clause 18: The computing environment of any of the clauses 15-17, wherein storage traffic bypasses the sNICs.

Clause 19: The computing environment of any of the clauses 15-18, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 20: The computing environment of any of the clauses 15-19, wherein at least two top-of-rack switches are configured with SDN agents configured to manage functionality of the SDN appliance.

The disclosure presented herein also encompasses the subject matter set forth in the following clauses:

Clause 1:

A method for processing data packets and implementing policies in a software defined network (SDN) of a virtual computing environment, by at least two SDN appliances configured to disaggregate enforcement of policies of the SDN from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC is associated with the first SDN appliance is paired with an sNIC associated with the second SDN appliance;

each paired sNIC is configured to serve a same floating network interface;

the method comprising:

selecting one of the SDN appliances as an active SDN appliance, wherein the other SDN appliance is a passive SDN appliance;

announcing a same virtual IP (VIP) via border gateway protocol (BGP) for each paired sNIC;

for each paired sNIC, replicating active flows from an active sNIC to a passive sNIC; and in response to a failure of the active SDN appliance:

withdrawing routes from the active SDN appliance; and causing the ToRs to redirect data traffic to the passive SDN appliance.

Clause 2: The method of clause 1, further comprising:

receiving, from a device that is remote from the virtual computing environment, a data packet addressed to an endpoint in a virtual network hosted by one of the virtual machines, the data packet comprising an identifier indicative of the remote device;

based on the identifier:

determining that the data packet is associated with the virtual network; and based on the determined association, mapping one of a plurality of policies to a data flow of the virtual network;

modifying the packet in accordance with the mapped policy; wherein the mapped policy is dynamically adjustable based on the data flow; and forwarding the modified packet to the endpoint in the virtual network.

Clause 3: The method of any of clauses 1-2, wherein the VIP is announced via short path using BGP, further comprising announcing a second VIP announced with a long path using BGP, wherein the second VIP is used by the floating network interfaces when in passive mode.

Clause 4: The method of any of clauses 1-3, wherein paired sNICs announce the same set of VIPs.

Clause 5: The method of any of clauses 1-4, wherein flow replication is based on the floating network interfaces, and the direction of flow replication is active to passive.

Clause 6: The method of any of clauses 1-5, wherein a single floating network interface is programmed on multiple sNICs.

Clause 7: A system comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC is associated with the first SDN appliance is paired with an sNIC associated with the second SDN appliance;

each paired sNIC is configured to serve a same floating network interface;

the system configured to:

select one of the SDN appliances as an active SDN appliance, wherein the other SDN appliance is a passive SDN appliance;

announce a same virtual IP (VIP) via border gateway protocol (BGP) for each paired sNIC;

for each paired sNIC, replicate active flows from an active sNIC to a passive sNIC; and in response to a failure of the active SDN appliance, withdraw routes from the active SDN appliance and cause the ToRs to redirect data traffic to the passive SDN appliance.

Clause 8: The system of clause 7, wherein the ToRs are configured to perform traffic load balancing, splitting, or sharding for selected floating network interfaces across VIPs of cards on which the selected floating network interface is provisioned.

Clause 9: The system of any of clauses 7 and 8, wherein a control plane of the virtual computing environment is configured to create pairing relationships between sNICs, wherein the paired sNICs are configured with a same ENI and policy.

Clause 10: The system of any clauses 7-9, wherein in response to a failure of an SDN appliance not available for a threshold period of time:

withdrawing the pairing relationship from an associated sNIC; and establishing a new pairing to another sNIC.

Clause 11: The system of any clauses 7-10, wherein the SDN appliance is implemented as a distributed appliance where the sNICs are physically distributed among one or more top-of-rack switches, the servers communicatively coupled to network interfaces of the top-of-rack switches so that each of the servers have a switchable communications path to each sNIC of the top-of-rack switches.

Clause 12: The system of any clauses 7-11, wherein the VIP is announced via short path using BGP, further comprising announcing a second VIP announced with a long path using BGP,k wherein the second VIP is used by the floating network interfaces when in passive mode.

Clause 13: The system of any clauses 7-12, wherein paired sNICs announce the same set of VIPs.

Clause 14: The system of any clauses 7-13, wherein flow replication is based on the floating network interfaces, and the direction of flow replication is active to passive.

Clause 15: A data center rack comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC is associated with the first SDN appliance is paired with an sNIC associated with the second SDN appliance;

each paired sNIC is configured to serve a same floating network interface;

the data center rack configured to:

select one of the SDN appliances as an active SDN appliance, wherein the other SDN appliance is a passive SDN appliance;

announce a same virtual IP (VIP) via border gateway protocol (BGP) for each paired sNIC;

for each paired sNIC, replicate active flows from an active sNIC to a passive sNIC; and in response to a failure of the active SDN appliance, withdraw routes from the active SDN appliance and cause the ToRs to redirect data traffic to the passive SDN appliance.

Clause 16: The computing environment of clause 15, wherein the VIP is announced via short path using BGP, further comprising announcing a second VIP announced with a long path using BGP, wherein the second VIP is used by the floating network interfaces when in passive mode.

Clause 17: The computing environment of any of clauses 15 and 16, wherein paired sNICs announce the same set of VIPs.

Clause 18: The computing environment of any of the clauses 15-17, wherein flow replication is based on the floating network interfaces, and the direction of flow replication is active to passive.

Clause 19: The computing environment of any of the clauses 15-18, wherein a single floating network interface is programmed on multiple sNICs.

Clause 20: The computing environment of any of the clauses 15-19, wherein the ToRs are configured to perform traffic load balancing, splitting, or sharding for selected floating network interfaces across VIPs of cards on which the selected floating network interface is provisioned.

The disclosure presented herein also encompasses the subject matter set forth in the following clauses:

Clause 1: A method for processing data packets and implementing policies in a software defined network (SDN) of a virtual computing environment, by at least two SDN appliances configured to disaggregate enforcement of policies of the SDN from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC that is associated with the first SDN appliance is paired with an sNIC associated with the second SDN appliance;

each paired sNIC is configured to serve multiple floating network interfaces;

each floating network interface is serviced by multiple sNICs;

the method comprising:

selecting one of the SDN appliances as an active SDN appliance, wherein the other SDN appliance is a passive SDN appliance;

announcing a different virtual IP (VIP) via border gateway protocol (BGP) for each paired sNIC;

configuring each floating network interface to be serviced by multiple VIPs;

splitting, by the ToRs, data traffic equally across different VIPs; and performing a flow synchronization process between paired sNICs as passive sNICs become active.

Clause 2: The method of clause 1, wherein the flow synchronization process comprises:

implementing at least two colors;

associating each connection and entry in a flow table with a color;

establishing a pairing relationship between a primary sNIC and a secondary sNIC; wherein a connection to a paired device can be replicated;

assigning a color to an sNIC that comes online;

as the online SNIC receives traffic, adding new flows to the flow table with the assigned color and replicated new flows to paired sNICs, wherein all connections use the same color until the pairing fails, and continues using the same color if there is no active pairing;

when pairing is re-established, changing the assigned color to a new color;

using the new color for new flows that are added to the flow table and replicating new flows to the paired sNIC; and replicating existing connections to a new device to which a new pairing was created or an existing device to which pairing was re-established, wherein:

only connections which have different color than an actively used color is replicated;

entries with a currently active color are not replicated.

Clause 3: The method of any of clauses 1-2, further comprising clearing a state of a flow table of a secondary sNIC when pairing is re-established.

Clause 4: The method of any of clauses 1-3, further comprising ignoring update messages when a connection does not already exist in a flow table.

Clause 5: The method of any of clauses 1-4, wherein in response to a single card sNIC:

if outage of the single sNIC persists, selecting a different sNIC on another SDN appliance and initiating pairing with an sNIC on the another appliance; and announce a VIP of the selected sNIC as active when flow synchronization completes for all floating network interfaces.

Clause 6: The method of any of clauses 1-5, wherein in response to a single SDN appliance failure: if outage of the single SDN appliance persists, removing existing pairing relationship, allocating a new SDN appliance, and creating a pairing relationship with the new SDN appliance.

Clause 7: A system comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC that is associated with the first SDN appliance is paired with an sNIC associated with the second SDN appliance;

each paired sNIC is configured to serve multiple floating network interfaces;

each floating network interface is serviced by multiple sNICs;

the system configured to:

selecting one of the SDN appliances as an active SDN appliance, wherein the other SDN appliance is a passive SDN appliance;

announcing a different virtual IP (VIP) via border gateway protocol (BGP) for each paired sNIC;

configuring each floating network interface to be serviced by multiple VIPs;

splitting, by the ToRs, data traffic equally across different VIPs; and performing a flow synchronization process between paired sNICs as passive sNICs become active.

Clause 8: The system of clause 7, wherein the flow synchronization process comprises:

implementing at least two colors;

associating each connection and entry in a flow table with a color;

establishing a pairing relationship between a primary sNIC and a secondary sNIC; wherein a connection to a paired device can be replicated;

assigning a color to an sNIC that comes online; and as the online SNIC receives traffic, adding new flows to the flow table with the assigned color and replicated new flows to paired sNICs, wherein all connections use the same color until the pairing fails, and continues using the same color if there is no active pairing;

when pairing is re-established, changing the assigned color to a new color;

using the new color for new flows that are added to the flow table and replicating new flows to the paired sNIC;

replicating existing connections to a new device to which a new pairing was created or an existing device to which pairing was re-established, wherein: only connections which have different color than an actively used color is replicated;

entries with a currently active color are not replicated.

Clause 9: The system of any of clauses 7 and 8, further comprising clearing a state of a flow table of a secondary sNIC when pairing is re-established.

Clause 10: The system of any clauses 7-9, further comprising ignoring update messages when a connection does not already exist in a flow table.

Clause 11: The system of any clauses 7-10, wherein in response to a single card sNIC:

if outage of the single sNIC persists, selecting a different sNIC on another SDN appliance and initiating pairing with an sNIC on the another appliance; and announce a VIP of the selected sNIC as active when flow synchronization completes for all floating network interfaces.

Clause 12: The system of any clauses 7-11, wherein in response to a single SDN appliance failure: if outage of the single SDN appliance persists, removing existing pairing relationship, allocating a new SDN appliance, and creating a pairing relationship with the new SDN appliance.

Clause 13: The system of any clauses 7-12, wherein 8 colors are implemented that are represented by 3 bits.

Clause 14: The system of any clauses 7-13, wherein flow splitting is performed by an intelligent ToR, on a source based on stable hashing, or directly on a source node.

Clause 15: A data center rack comprising:

a plurality of servers communicatively coupled to at least two software defined network (SDN) appliances configured to disaggregate enforcement of policies of a SDN of a virtual computing environment from hosts of the virtual computing environment, the hosts implemented on servers communicatively coupled to network interfaces of the SDN appliance, the servers hosting a plurality of virtual machines, the servers communicatively coupled to network interfaces of at least two top-of-rack switches (ToRs), the SDN appliance comprising a plurality of smart network interface cards (sNICs) configured to implement functionality of the SDN appliance, the sNICs having a floating network interface configured to provide a virtual port connection to an endpoint within a virtual network of the virtual computing environment, wherein:

each sNIC that is associated with the first SDN appliance is paired with an sNIC associated with the second SDN appliance;

each paired sNIC is configured to serve multiple floating network interfaces;

each floating network interface is serviced by multiple sNICs;

the data center rack configured to:

selecting one of the SDN appliances as an active SDN appliance, wherein the other SDN appliance is a passive SDN appliance;

announcing a different virtual IP (VIP) via border gateway protocol (BGP) for each paired sNIC;

configuring each floating network interface to be serviced by multiple VIPs;

splitting, by the ToRs, data traffic equally across different VIPs; and performing a flow synchronization process between paired sNICs as passive sNICs become active.

Clause 16: The computing environment of clause 15, wherein the flow synchronization process comprises:

implementing at least two colors;

associating each connection and entry in a flow table with a color;

establishing a pairing relationship between a primary sNIC and a secondary sNIC; wherein a connection to a paired device can be replicated;

assigning a color to an sNIC that comes online;

as the online SNIC receives traffic, adding new flows to the flow table with the assigned color and replicated new flows to paired sNICs, wherein all connections use the same color until the pairing fails, and continues using the same color if there is no active pairing;

when pairing is re-established, changing the assigned color to a new color;

using the new color for new flows that are added to the flow table and replicating new flows to the paired sNIC; and replicating existing connections to a new device to which a new pairing was created or an existing device to which pairing was re-established, wherein:

only connections which have different color than an actively used color is replicated;

entries with a currently active color are not replicated.

Clause 17: The computing environment of any of clauses 15 and 16, further comprising clearing a state of a flow table of a secondary sNIC when pairing is re-established.

Clause 18: The computing environment of any of the clauses 15-17, further comprising ignoring update messages when a connection does not already exist in the flow table.

Clause 19: The computing environment of any of the clauses 15-18, wherein in response to a single card sNIC:

if outage of a single sNIC persists, selecting a different sNIC on another SDN appliance and initiating pairing with an sNIC on the another appliance; and announce a VIP of the selected sNIC as active when flow synchronization completes for all floating network interfaces.

Clause 20: The computing environment of any of the clauses 15-19, wherein in response to a single SDN appliance failure: if outage of the single SDN appliance persists, removing existing pairing relationship, allocating a new SDN appliance, and creating a pairing relationship with the new SDN appliance.

The invention claimed is:

1. A method for processing data packets in a virtualized computing environment, the method comprising:

receiving, by a hardware-based networking device configured to disaggregate processing of data packets from hosts of the virtualized computing environment, a data packet having a source from or destination to an endpoint in a virtual network of the virtualized computing environment, wherein the hardware-based networking device comprises a hardware-based component implementing a plurality of behavioral models indicative of packet processing graphs for data flows in the virtualized computing environment that are implemented in the hardware-based component without invoking software-based processing of the data flows;

determining, by the hardware-based component, that the data packet is a first packet of a data flow to or from the endpoint;

based on the determination, mapping, by the hardware-based component, one of the behavioral models to the data flow;

modifying, by the hardware-based component, the packet in accordance with the mapped behavioral model, wherein the mapped behavioral model is processed in the hardware-based component;

storing, by the hardware-based component, a connection state of the data flow; and processing, by the hardware-based component, subsequent data packets of the data flow based on the stored connection state.

2. The method of claim 1, further comprising:

determining that a received subsequent data packet is a last packet of the data flow; and in response to the determination, removing the state of the data flow.

3. The method of claim 1, wherein the plurality of behavioral models comprises a threshold number or percentage of data flows of the virtualized computing environment.

4. The method of claim 1, wherein the hardware-based component is one of a flexible hardware engine, specialized processor, or programmable circuit.

5. The method of claim 1, wherein the hardware-based component comprises an inbound packet processing pipeline and outbound packet processing pipeline.

6. The method of claim 1, wherein the flows are stored in the hardware-based component in a generic flow table (GFT).

7. The method of claim 1, wherein the hardware-based component comprises one or more of a network address translation (NAT) layer, virtual network (VNET) layer, a decapsulation layer, or transposition layer.

8. The method of claim 5, wherein the inbound packet processing pipeline and outbound packet processing pipeline comprise an access control list (ACL) pipeline.

9. A hardware-based networking device configured to disaggregate processing of data packets from hosts of a virtualized computing environment, the hardware-based networking device comprising a hardware-based component implementing a plurality of behavioral models indicative of packet processing graphs for data flows in the virtualized computing environment that are implemented in the hardware-based component without invoking software-based processing of the data flows, the hardware-based networking component configured to:
receive a data packet having a source from or destination to an endpoint in a virtual network of a virtualized computing environment;
determine that the data packet is a first packet of a data flow to or from the endpoint;
based on the determination, map one of the behavioral models to the data flow;
modify, using the hardware-based component implementing the plurality of behavioral models indicative of packet processing graphs for data flows in the virtualized computing environment, the packet in accordance with the mapped behavioral model, wherein the mapped behavioral model is processed in the hardware-based component;
store a connection state of the data flow; and
process subsequent data packets of the data flow based on the stored connection state.

10. The hardware-based networking device of claim 9, wherein the hardware-based networking device is further configured to perform packet transformation for VNET to VNET data traffic.

11. The hardware-based networking device of claim 9, wherein the hardware-based networking device is further configured to perform packet transformation for load balancer traffic.

12. The hardware-based networking device of claim 9, wherein the hardware-based networking device is further configured to perform packet transformation for private link traffic.

13. The hardware-based networking device of claim 9, wherein the hardware-based networking device is further configured to perform packet transformation for service tunneling.

14. The hardware-based networking device of claim 9, wherein the hardware-based networking device is further configured to perform packet transformation for one or more of VNET encryption, telemetry, BGP, debugging, or flow replication.

15. The hardware-based networking device of claim 9, wherein the hardware-based networking device is further configured to:
determine that a received subsequent data packet is a last packet of the data flow; and
in response to the determination, remove the state of the data flow.

16. A computing network comprising a plurality of computing devices and one or more hardware-based networking devices configured to disaggregate processing of data packets from the plurality of computing devices, the hardware-based networking device comprising a hardware-based component implementing a plurality of behavioral models indicative of packet processing graphs for data flows in the computing network that are implemented in the hardware-based component without invoking software-based processing of the data flows, the hardware-based networking device configured to:
receive a data packet having a source from or destination to an endpoint in a virtual network of a virtualized computing environment;
determine that the data packet is a first packet of a data flow to or from the endpoint;
based on the determination, map one of the behavioral models to the data flow;
modify, using the hardware-based component implementing the plurality of behavioral models indicative of packet processing graphs for data flows in the virtualized computing environment, the packet in accordance with the mapped behavioral model, wherein the mapped behavioral model is processed in the hardware-based component;
store a connection state of the data flow; and
process subsequent data packets of the data flow based on the stored connection state.

17. The computing network of claim 16, wherein the plurality of behavioral models comprises a threshold number or percentage of data flows of the virtualized computing environment.

18. The computing network of claim 16, wherein the hardware-based component is one of a flexible hardware engine, specialized processor, or programmable circuit.

19. The computing network of claim 16, wherein the hardware-based component comprises an inbound packet processing pipeline and outbound packet processing pipeline.

20. The computing network of claim 19, wherein the flows are stored in the hardware-based component in a GFT.

* * * * *